United States Patent
Yokoyama et al.

(10) Patent No.: US 12,306,001 B2
(45) Date of Patent: May 20, 2025

(54) RUNNING MODE PROPOSAL DEVICE, NAVIGATION DEVICE, AND RUNNING CONTROL DEVICE

(71) Applicant: TOYOTA JIDOSHA KABUSHIKI KAISHA, Aichi-ken (JP)

(72) Inventors: Daiki Yokoyama, Gotemba (JP); Toshiya Hashimoto, Miyoshi (JP); Hiroya Chiba, Susono (JP); Shuntaro Okazaki, Shizuoka-ken (JP); Shogo Tsuge, Fuji (JP); Kazuhisa Matsuda, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 288 days.

(21) Appl. No.: 17/873,151

(22) Filed: Jul. 26, 2022

(65) Prior Publication Data
US 2023/0032752 A1 Feb. 2, 2023

(30) Foreign Application Priority Data
Jul. 30, 2021 (JP) .................. 2021-125869

(51) Int. Cl.
*G01C 21/34* (2006.01)
*B60L 53/12* (2019.01)
*B60L 58/13* (2019.01)

(52) U.S. Cl.
CPC .......... *G01C 21/3469* (2013.01); *B60L 53/12* (2019.02); *B60L 58/13* (2019.02); *G01C 21/3415* (2013.01)

(58) Field of Classification Search
CPC ............ G01C 21/3469; G01C 21/3415; B60L 53/12; B60L 58/13
See application file for complete search history.

(56) References Cited

U.S. PATENT DOCUMENTS

2020/0369269 A1* 11/2020 Tanaka ............. G08G 1/096725
2021/0254987 A1* 8/2021 Shibata .............. G01C 21/3469

FOREIGN PATENT DOCUMENTS

| JP | 2013-015462 A | 1/2013 |
| JP | 2013-192412 A | 9/2013 |

(Continued)

OTHER PUBLICATIONS

JP2014240757A translate (Year: 2014).*

*Primary Examiner* — Yufeng Zhang
(74) *Attorney, Agent, or Firm* — HAUPTMAN HAM, LLP

(57) ABSTRACT

A running mode proposal device for proposing a running mode up to a destination of a vehicle is configured to: select a first running route by a predetermined algorithm unrelated to noncontact power supply; project, when assuming the vehicle runs on a predetermined running route, a value of a parameter relating to an electric energy projected as being supplied at a power supply section on the running route to the vehicle; select a second running route by which a projected supplied electric energy will be greater than a predetermined standard electric energy if the projected value of the parameter when assuming the vehicle runs on the first running route is a value indicating the projected supplied electric energy is less than the standard electric energy; and propose, as the running route, the first running route, and, when the second running route is selected, further proposing a second running route.

10 Claims, 14 Drawing Sheets

(56) References Cited

FOREIGN PATENT DOCUMENTS

| | | |
|---|---|---|
| JP | 2013188032 A | 9/2013 |
| JP | 2013-200247 A | 10/2013 |
| JP | 2014-240757 A | 12/2014 |
| WO | 2017/199775 A1 | 11/2017 |

* cited by examiner

RUNNING MODE PROPOSAL DEVICE, NAVIGATION DEVICE, AND RUNNING CONTROL DEVICE

RELATED APPLICATIONS

The present application claims priority of Japanese Patent Application No. 2021-125869 filed Jul. 30, 2021, the disclosure of which is hereby incorporated by reference herein in its entirety.

FIELD

The present disclosure relates to a running mode proposal device, navigation device, and running control device.

BACKGROUND

It has been known in the past to supply power to electric vehicles (including BEV, PHEVs, HEVs, etc.) by noncontact from ground power supply apparatuses provided at the ground surface, while the vehicles are running. Further, calculating power to be supplied from ground power supply apparatuses to vehicles, based on time periods when running on a road at which the ground power supply apparatuses are provided and an efficiency of charging from the ground power supply apparatuses to the vehicles, and controlling the ground power supply apparatuses based on the calculated supplied power has been studied (for example, see JP2013-188032A1).

However, with the technique described in JP2013-188032A1, depending on the length of a power supply section at which ground power supply apparatuses provided on a running route of a vehicle, sometimes power sufficient for the vehicle to reach its destination cannot be supplied to the vehicle, even if increasing to the limit the transmitted power at the ground power supply apparatuses.

SUMMARY

In consideration of the above problem, an object of the present disclosure is to ensure a running vehicle can suitably receive power from ground power supply apparatuses and thereby enable power required for operation of the vehicle to be received from the ground power supply apparatuses.

The gist of the present disclosure is as follows.

(1) A running mode proposal device for proposing a running mode up to a destination of a vehicle, comprising:
a first route selecting part for selecting a first running route up to the destination by a predetermined algorithm unrelated to noncontact power supply;
an electric energy projecting part for projecting, when assuming the vehicle runs on a predetermined running route, a value of a parameter relating to an electric energy projected as being supplied at a power supply section where power is supplied by noncontact from a ground power supply apparatus on the running route to the vehicle;
a second route selecting part for selecting a second running route by which a projected supplied electric energy will be greater than or equal to a predetermined standard electric energy if the projected value of the parameter when assuming the vehicle runs on the first running route is a value indicating the projected supplied electric energy is less than the standard electric energy; and
a running mode proposing part for proposing, as the running route up to the destination, the first running route, and, when the second running route is selected, further proposing a second running route.

(2) The running mode proposal device according to above (1), further comprising a standard electric energy setting part for setting, as the standard electric energy, a value obtained by subtracting a current charged amount of the battery of the vehicle from a value obtained by adding a predetermined electric energy required at the time of arrival to the electric energy required for the vehicle to run to the destination along each running route.

(3) The running mode proposal device according to above (2), wherein the electric energy required at the time of arrival is zero.

(4) The running mode proposal device according to any one of above (1) to (3), wherein the electric energy projecting part calculates the projected electric energy, based on an average speed of vehicles running over the power supply section in the past, a length of the power supply section, and the projected power supplied per unit time from the ground power supply apparatus to the vehicle when the vehicle runs over that power supply section.

(5) The running mode proposal device according to any one of above (1) to (4),
further comprising an arrival time estimating part for estimating an arrival time at the destination when the vehicle runs on each running route, wherein
when there is a contact power supply facility on the first running route, the arrival time estimating part estimating, as a projected arrival time at the destination when the vehicle runs on the first running route, the time when the vehicle will reach the destination when assuming supply of power at the contact power supply facility is performed so that a charged amount of the battery of the vehicle when the vehicle reaches the destination is greater than or equal to a predetermined electric energy required at the time of arrival.

(6) A navigation device comprising:
a running mode proposal device according to any one of above (1) to (5);
a route selecting part for making a user select a running route for road guidance among running routes proposed by the running mode proposal device; and
a running route setting part setting the running route selected by the user as the running route up to the destination.

(7) A navigation device comprising:
a running mode proposal device according to above (5); and
a running route setting part for setting, as the running route up to the destination, the running route with an earlier arrival time estimated by the arrival time estimating part among the first running route and the second running route, when the second running route is proposed by the running mode proposal device.

(8) A running control device of a vehicle comprising:
a running mode proposal device according to any one of above (1) to (5);
a running route setting part for setting, as the running route up to the destination, a second running route when a second running route is proposed by the running mode proposal device; and
an operation control part for controlling the vehicle so that the vehicle autonomously runs along the running route set by the running route setting part.

(9) A running control device of a vehicle comprising:
a running mode proposal device according to above (5);
a running route setting part for setting, as the running route up to the destination, the running route with an earlier arrival time estimated by the arrival time estimating part among the first running route and the second running route, when the second running route is proposed by the running mode proposal device; and
an operation control part for controlling the vehicle so that the vehicle autonomously runs along the running route set by the running route setting part.

(10) A running mode proposal device for proposing a running mode up to a destination of a vehicle, comprising:
a first route selecting part for selecting a first running route up to the destination by a predetermined algorithm unrelated to noncontact power supply;
an electric energy projecting part for projecting, when assuming the vehicle runs on a predetermined running route, a value of a parameter relating to an electric energy projected as being supplied at a power supply section where power is supplied by noncontact from a ground power supply apparatus on the running route to the vehicle, when the vehicle runs over the power supply section at a predetermined standard speed; and
a running mode proposing part for proposing running over the power supply section at a target running speed slower than the standard speed, if the projected value of the parameter when assuming the vehicle runs on the first running route is a value indicating that the projected supplied electric energy is less than a predetermined standard electric energy.

(11) The running mode proposal device according to above (10), further comprising a standard electric energy setting part for setting, as the standard electric energy, the value obtained by subtracting a current charged amount of the battery of the vehicle from a value obtained by adding a predetermined electric energy required at the time of arrival to the electric energy required for the vehicle to run to the destination along each running route.

(12) The running mode proposal device according to above (11), wherein the electric energy required at the time of arrival is zero.

(13) The running mode proposal device according to any one of above (10) to (12), wherein the electric energy projecting part calculates the projected electric energy, based on a standard speed of the vehicle running on the power supply section, a length of the power supply section, and the power supplied per unit time from the ground power supply apparatus to the vehicle when the vehicle runs on that power supply section.

(14) The running mode proposal device according to any one of above (10) to (13), further comprising:
a second route selecting part for selecting a second running route by which an electric energy supplied will be greater than or equal to the standard electric energy, if the projected value of the parameter when assuming the vehicle runs on the first running route is a value indicating the projected supplied electric energy is less than the standard electric energy, wherein
the running mode proposing part proposes, as the running route up to the destination, a second running route in addition to the first running route, when the second running route is selected.

(15) A running control device of a vehicle comprising:
a running mode proposal device according to above (14); and an operation control part for controlling the vehicle so as to run on the second running route when the second running route is proposed by the running mode proposal device and the target running speed is less than a lower limit speed.

DESCRIPTION OF EMBODIMENTS

Figure 1:
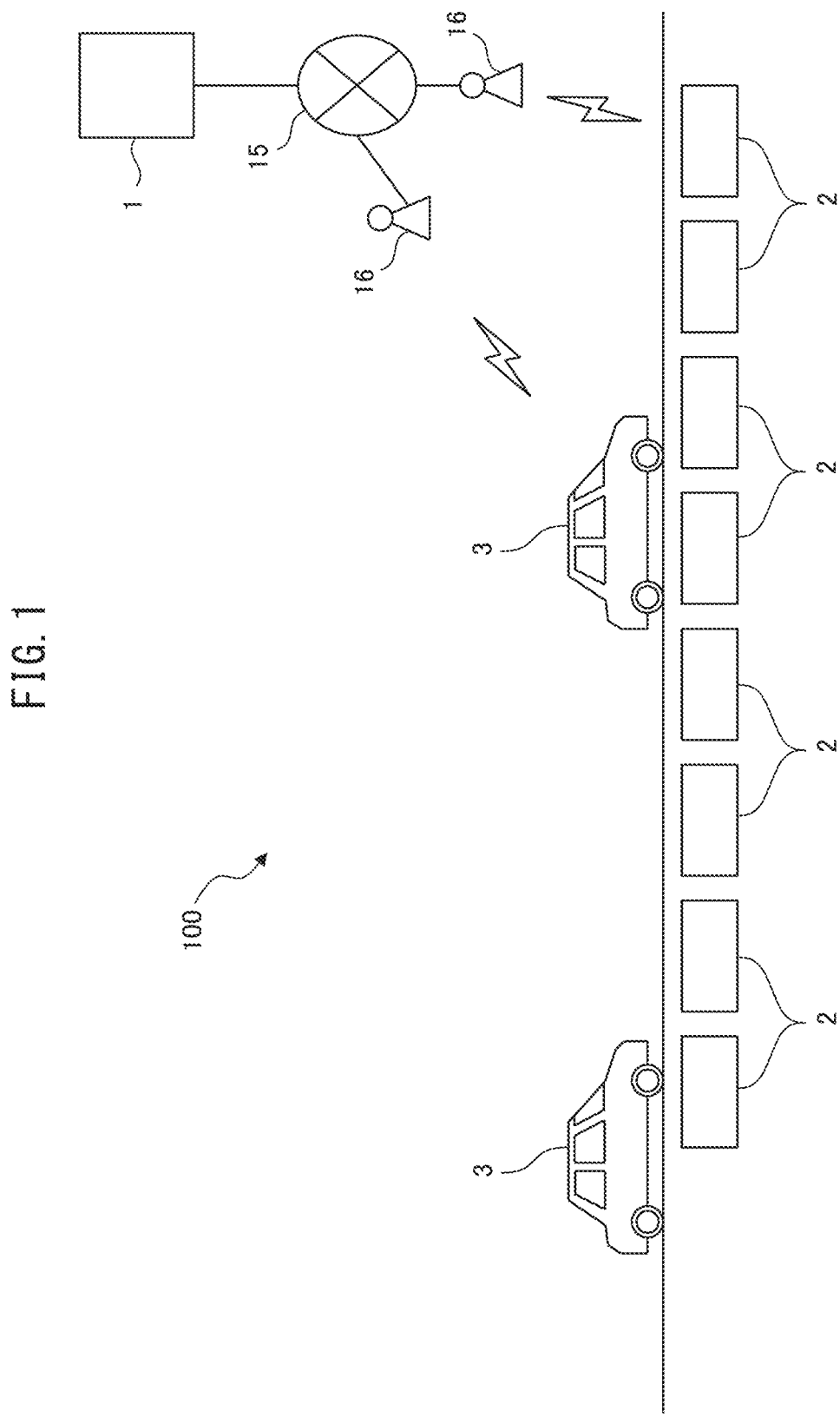
FIG. 1 a view schematically showing a configuration of a noncontact power supply system.

Below, referring to the drawings, embodiments will be explained in detail. Note that, in the following explanation, similar elements will be assigned the same reference notations.

First Embodiment

Overall Configuration of Noncontact Power Supply System
FIG. 1 is a view schematically showing the configuration of a noncontact power supply system 100. The noncontact power supply system 100 has a server 1, ground power supply apparatuses 2, and vehicles 3, and transfers power by noncontact from the ground power supply apparatuses 2 to the vehicles 3 by magnetic field resonance coupling (magnetic field resonance). In particular, in the present embodiment, the noncontact power supply system 100 transfers power by noncontact from the ground power supply apparatuses 2 to the vehicles 3 while the vehicles 3 are running. Therefore, the ground power supply apparatuses 2 transmit power to the vehicles 3 by noncontact while the vehicles 3 are running, and the vehicles 3 receive power by noncontact from the ground power supply apparatuses 2 while the vehicles 3 are running. A ground power supply apparatus 2 has a power transmission apparatus 4 configured so as to transmit power by noncontact to the vehicle 3, while a vehicle 3 has a power reception apparatus 5 configured to receive power from a power transmission apparatus 4 by noncontact (see FIG. 3). As shown in FIG. 1, the ground power supply apparatuses 2 are arranged aligned in the running direction of the vehicles 3. Power transmission apparatuses 4 of the ground power supply apparatuses 2 are buried in the road (in the ground) on which the vehicles 3 run, for example, at the centers of the lanes on which the vehicles 3 run.

Note that, the term "while running" means the state where a vehicle 3 is positioned on a road for running. Therefore, the term "while running" includes not only the state where the vehicle 3 is actually running at any speed greater than zero, but also, for example, the state where it is stopped on a road due to waiting for a traffic light to change. On the other hand, a case where a vehicle 3 is positioned on a road, but for example is being parked, is not included in "while running".

Configuration of Server

Figure 4:
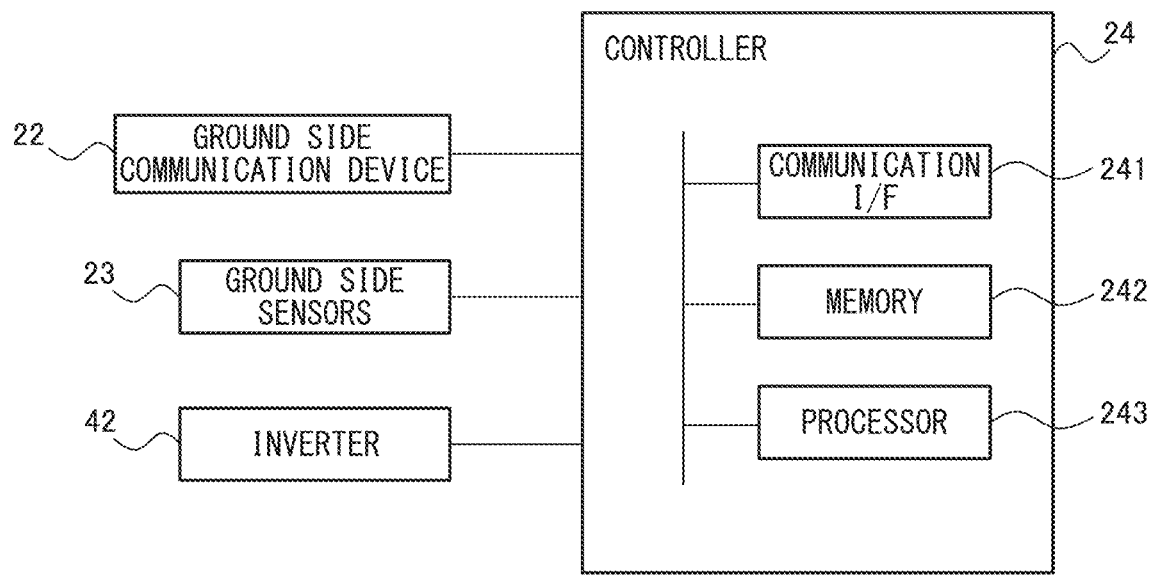
FIG. 4 is a schematic view of the configurations of a controller and equipment connected to the controller.
Figure 5:
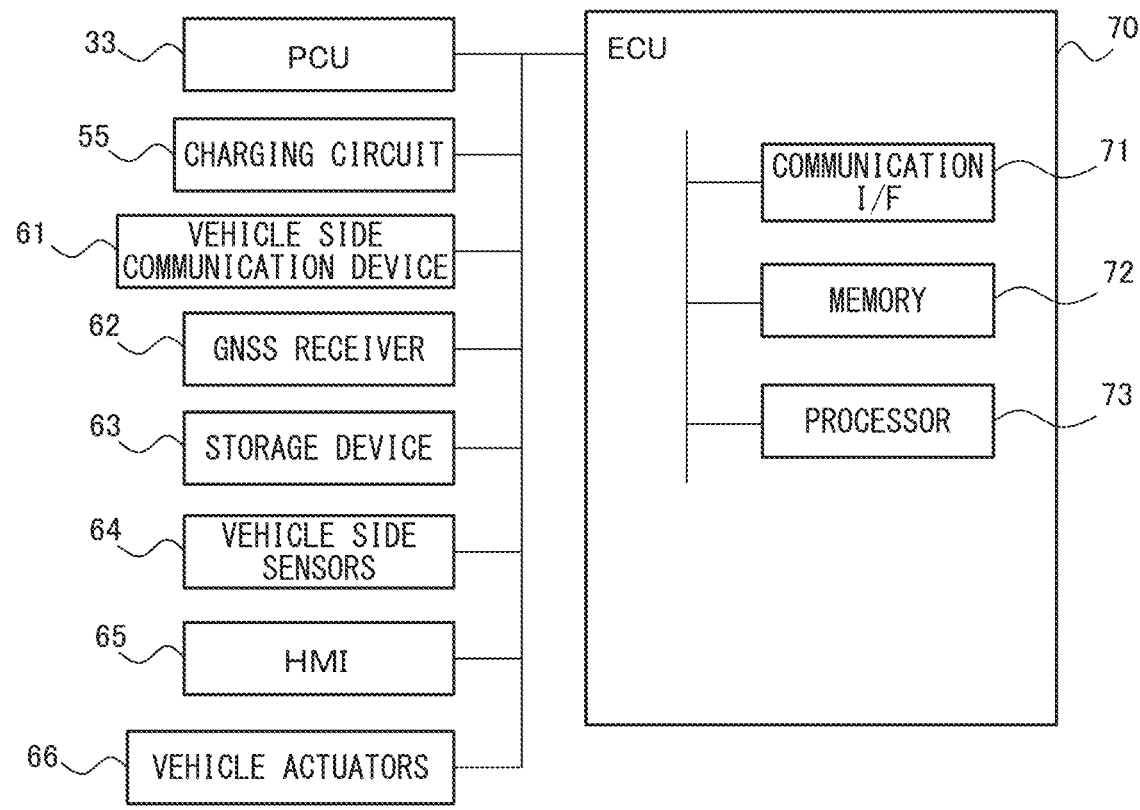
FIG. 5 is a schematic view of the configurations of an ECU of a vehicle and equipment connected to the ECU.

The server 1 communicates with ground side communication devices 22 of the ground power supply apparatuses 2 (FIG. 4) and vehicle side communication devices 61 of the vehicles 3 (FIG. 5). Specifically, the server 1 is connected to a plurality of wireless base stations 16 through a communication network 15 configured by optical communication lines or the like. The vehicle side communication devices 61 and the ground side communication devices 22 communicate with the wireless base stations 16 using wide area wireless communication. Therefore, the vehicle side communication devices 61 of the vehicles 3, the ground side communication devices 22 of the ground power supply apparatuses 2, and the server 1 communicate using wide area wireless communication. As the wide area wireless communication, various wireless communication schemes with long communication distances can be used. For example, communication based on the 4G, LTE, 5G, WiMAX formulated by the 3GPP or IEEE, or any other communication standard is used.

Note that, the ground side communication devices 22 may be connected to the communication network 15 by cables. Therefore, the ground side communication devices 22 may be connected with the server 1 not wirelessly, but by cables. Therefore, the server 1 communicates with the vehicles 3 by wide area wireless communication, and communicates with the ground power supply apparatuses 2 wirelessly or by cables.

Figure 2:
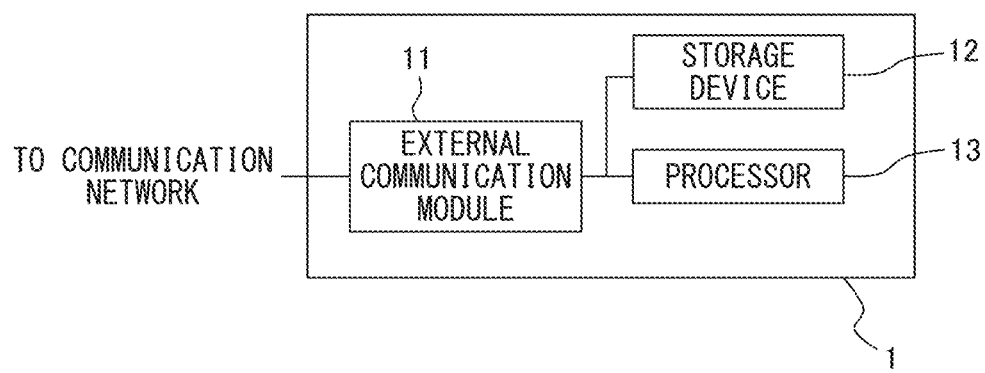
FIG. 2 a view schematically showing a hardware configuration of a server.

FIG. 2 is a view schematically showing a hardware configuration of the server 1. The server 1, as shown in FIG. 2, is provided with an external communication module 11, storage device 12, and processor 13. Further, the server 1 may have an input device such as a keyboard and mouse, and an output device such as a display.

The external communication module 11 communicates with equipment outside the server 1 (ground power supply apparatuses 2, vehicles 3, etc.) The external communication module 11 is provided with an interface circuit for connecting the server 1 to the communication network 15. The external communication module 11 is configured to be able to communicate with the plurality of vehicles 3 and the ground power supply apparatuses 2, through the communication network 15 and wireless base stations 16.

The storage device 12 has a volatile semiconductor memory (for example, RAM), nonvolatile semiconductor memory (for example, ROM), hard disk drive (HDD), solid state drive (SSD), or optical recording medium. The storage device 12 stores a computer program for the processor 13 to perform various processing and various data used when various processing is performed by the processor 13. Further, in the present embodiment, the storage device 12 stores map information. The map information includes, in addition to information relating to roads, information on installation positions of ground power supply apparatuses 2, and position information and power supply capacity information of contact power supply facilities such as charging stations.

The processor 13 has one or more CPUs and their peripheral circuits. The processor 13 may further have a GPU or processing circuit such as logic processing unit or arithmetic processing unit. The processor 13 performs various processing operations based on the computer program stored in the storage device 12 of the server 1.

Configuration of Ground Power Supply Apparatus

Figure 3:
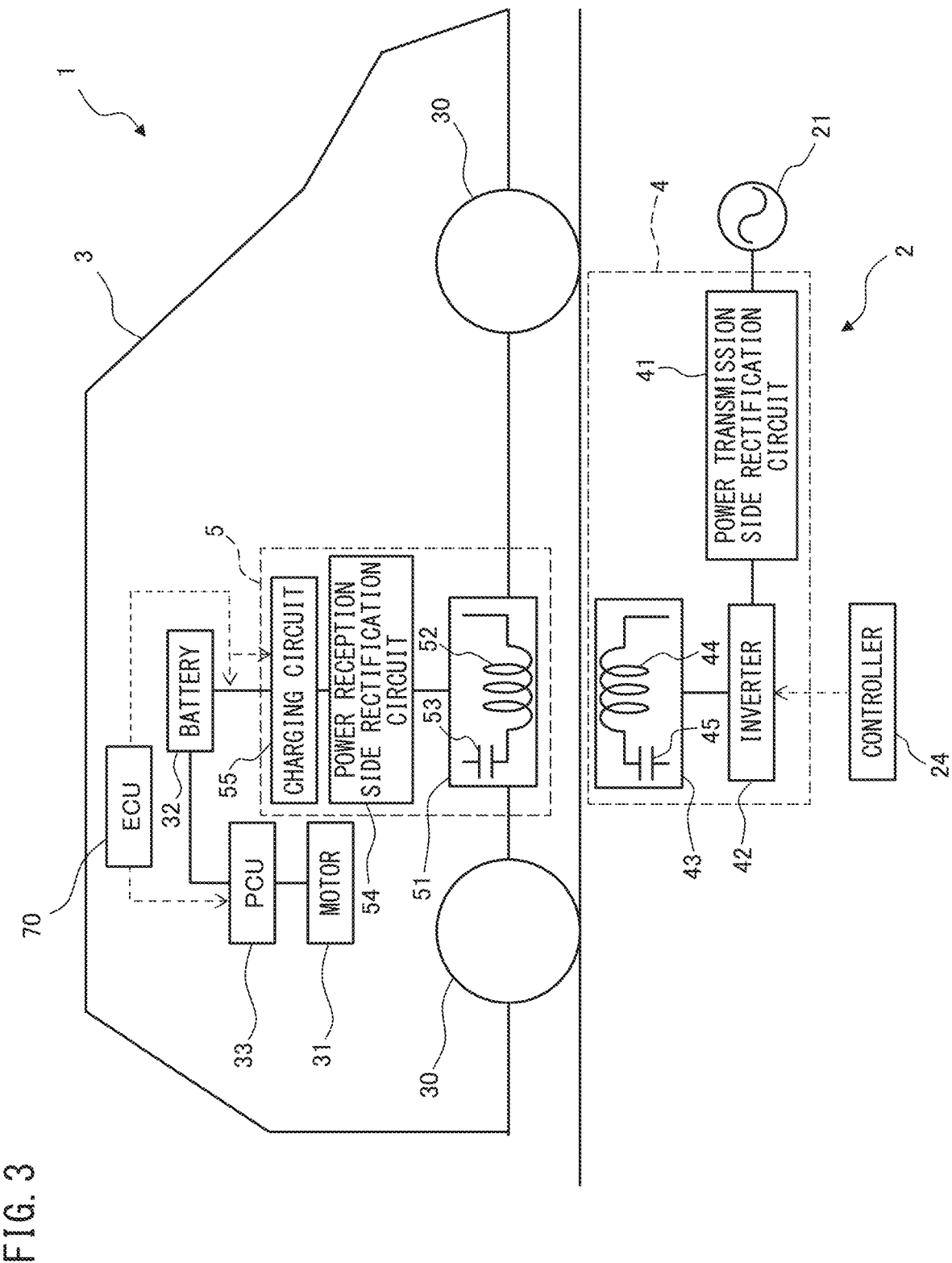
FIG. 3 is a view schematically showing the configurations of a ground power supply apparatus and a vehicle in a noncontact power supply system.

FIG. 3 is a view schematically showing the configurations of a ground power supply apparatus 2 and a vehicle 3 in the noncontact power supply system 100. FIG. 4 is a schematic view of the configurations of a controller 24 and equipment connected to the controller 24. As shown in FIGS. 3 and 4, the ground power supply apparatus 2 is provided with, in addition to the power transmission apparatus 4, a power source 21, ground side communication device 22, ground side sensors 23, and controller 24. The power source 21, ground side communication device 22, and controller 24 may be buried in the road or may be placed at a location other than the inside of the road (including on the ground).

The power source 21 supplies power to the power transmission apparatus 4. The power source 21, for example, is a commercial alternating current power source for supplying single-phase alternating current power. Note that, the power source 21 may be an alternating current power source for supplying three-phase alternating current power, or may be a direct current power source such as a fuel cell.

The power transmission apparatus 4 sends the power supplied from the power source 21 to the vehicle 3. The power transmission apparatus 4 has a power transmission side rectification circuit 41, inverter 42, and power transmission side resonance circuit 43. In the power transmission apparatus 4, the alternating current power supplied from the power source 21 is rectified and converted to direct current power at the power transmission side rectification circuit 41, this direct current power is converted to alternating current power at the inverter 42, and this alternating current power is supplied to the power transmission side resonance circuit 43.

The power transmission side rectification circuit 41 is electrically connected to the power source 21 and inverter 42. The power transmission side rectification circuit 41 rectifies the alternating current power supplied from the power source 21 to convert it to direct current power, and supplies the direct current power to the inverter 42. The power transmission side rectification circuit 41 is, for example, an AC/DC converter.

The inverter 42 is electrically connected to the power transmission side rectification circuit 41 and power transmission side resonance circuit 43. The inverter 42 converts the direct current power supplied from the power transmission side rectification circuit 41 to an alternating current power of a frequency higher than the alternating current power of the power source 21 (high frequency power), and supplies the high frequency power to the power transmission side resonance circuit 43.

The power transmission side resonance circuit 43 has a resonator comprised of a coil 44 and capacitor 45. The various parameters of the coil 44 and capacitor 45 (outside diameter and inside diameter of the coil 44, the number of turns of the coil 44, electrostatic capacity of the capacitor 45, etc.) are determined so that the resonance frequency of the power transmission side resonance circuit 43 is a predetermined set value. The predetermined set value is, for example, 10 kHz to 100 GHz, preferably is the 85 kHz determined by the SAE TIR J2954 standard as the frequency band for noncontact power transfer.

The power transmission side resonance circuit 43 is arranged at the center of the lane on which the vehicle 3 runs so that the center of the coil 44 is positioned at the center of the lane. If the high frequency power supplied from the inverter 42 is applied to the power transmission side resonance circuit 43, the power transmission side resonance circuit 43 generates an alternating magnetic field for power transmission. Note that, if the power source 21 is a direct current power supply, the power transmission side rectification circuit 41 may be omitted.

The ground side communication device 22 communicates with a wireless base station 16 by wide area wireless communication, and in turn communicates with the server 1 through the communication network 15. Alternatively, the ground side communication device 22 is connected by cable with the communication network 15 to communicate with the server 1. Further, the ground side communication device 22 is connected to the controller 24 through a signal wire.

The ground side sensors 23 detect the state of the ground power supply apparatus 2. In the present embodiment, the ground side sensors 23, for example, include a current sensor for detecting the current flowing to various equipment of the power transmission apparatus 4, a voltage sensor for detecting voltage applied to various equipment of the power transmission apparatus 4, and a foreign object sensor for detecting a foreign object on the road in which the power transmission apparatus 4 is buried. The outputs of the ground side sensors 23 are input to the controller 24.

The controller 24 is, for example, a general-purpose computer, and performs various control operations of the ground power supply apparatus 2. For example, the controller 24 is electrically connected to the inverter 42 of the power transmission apparatus 4, and controls the inverter 42 so as to control power transmission by the power transmission apparatus 4. Furthermore, the controller 24 controls the ground side communication device 22.

The controller 24 is provided with a communication interface 241, memory 242, and processor 243. The communication interface 241, memory 242, and processor 243 are electrically connected to each other through signal wires.

The communication interface 241 has an interface circuit for connecting the controller 24 to various equipment forming the ground power supply apparatus 2 (for example, the ground side communication device 22, ground side sensors 23, inverter 42, etc.) The controller 24 communicates with other equipment through the communication interface 241.

The memory 242, for example, has a volatile semiconductor memory (for example, RAM), nonvolatile semiconductor memory (for example, ROM). The memory 242 stores a computer program for performing various processing at the processor 243, various data, and the like, used when various processing is performed by the processor 243.

The processor 243 has one or more CPUs (central processing units) and their peripheral circuits. The processor 243 may further have a processing circuit such as a logic unit or arithmetic unit. The processor 243 performs various processing based on the computer program stored in the memory 242.

Configuration of Vehicle

FIG. 5 is a schematic view of the configurations of the ECU 70 of a vehicle 3 and equipment connected to the ECU 70. As shown in FIG. 3, the vehicle 3 has, in addition to the power reception apparatus 5, a motor 31, battery 32, and power control unit (PCU) 33. In addition, as shown in FIG. 5, the vehicle 3 is further provided with a vehicle side communication device 61, GNSS receiver 62, storage device 63, a plurality of vehicle side sensors 64, a human-machine interface (HMI) 65, vehicle actuators 66, and an electronic control unit (ECU) 70. In the present embodiment, the vehicle 3 is an electric vehicle (BEV) using the motor 31 to drive the vehicle 3. However, the vehicle 3 may be a hybrid vehicle (HEV, PHEV) using not only the motor 31 but also an internal combustion engine to drive the vehicle 3.

The motor 31 is, for example, an alternating current synchronous motor, and functions as an electric motor and a generator. When the motor 31 functions as an electric motor, the electrical power stored in the battery 32 is used as a source of power for driving the motor 31. The output of the motor 31 is transmitted through a reducer and axle to the wheels 30. On the other hand, at the time of deceleration of the vehicle 3, the motor 31 is driven by rotation of the wheels 30, and the motor 31 functions as a generator to produce regenerated power.

The battery 32 is a rechargeable secondary battery and is, for example, a lithium ion battery, or nickel-hydrogen battery. The battery 32 stores the power required for the vehicle 3 to run (for example, the drive power of the motor 31). If the power received by the power reception apparatus 5 from the power transmission apparatus 4 is supplied to the battery 32, the battery 32 is charged. Further, if the regenerated power produced by the motor 31 is supplied to the battery 32, the battery 32 is charged. If the battery 32 is charged, the amount of charge of the battery 32 is restored. Note that, the battery 32 may be able to be recharged through a charging port provided at the vehicle 3 by an outside power source other than the ground power supply apparatus 2.

The PCU 33 is electrically connected to the battery 32 and motor 31. The PCU 33 has an inverter, booster converter, and DC/DC converter. The inverter converts the direct current power supplied from the battery 32 to alternating current power, and supplies the alternating current power to the motor 31. On the other hand, the inverter converts the alternating current power generated by the motor 31 (regenerated power) to direct current power, and supplies the direct current power to the battery 32. The booster converter boosts the voltage of the battery 32 in accordance with need, when the power stored in the battery 32 is supplied to the motor 31. The DC/DC converter lowers the voltage of the battery 32, when the power stored in the battery 32 is supplied to the headlights or other electronic equipment.

The power reception apparatus 5 receives power from the power transmission apparatus 4, and supplies the received power to the battery 32. The power reception apparatus 5 has, as shown in FIG. 3, a power reception side resonance circuit 51, power reception side rectification circuit 54, and charging circuit 55.

The power reception side resonance circuit 51 is arranged at the bottom part of the vehicle 3 so that the distance from the road surface is smaller. In the present embodiment, the power reception side resonance circuit 51 is arranged at the center of the vehicle 3 in the vehicle width direction. The power reception side resonance circuit 51 has a configuration similar to the power transmission side resonance circuit 43, and has a resonator comprised of a coil 52 and capacitor 53. The various parameters of the coil 52 and capacitor 53 (outside diameter and inside diameter of the coil 52, the number of turns of the coil 52, electrostatic capacity of the capacitor 53, etc.) are determined so that the resonance frequency of the power reception side resonance circuit 51 matches the resonance frequency of the power transmission side resonance circuit 43. Note that, as long as the amount of deviation between the resonance frequency of the power reception side resonance circuit 51 and the resonance frequency of the power transmission side resonance circuit 43 is small, for example, the resonance frequency of the power reception side resonance circuit 51 is within a range of ±20% of the resonance frequency of the power transmission side resonance circuit 43, the resonance frequency of the power reception side resonance circuit 51 does not necessarily have to match the resonance frequency of the power transmission side resonance circuit 43.

As shown in FIG. 3, when the power reception side resonance circuit 51 faces a power transmission side resonance circuit 43, if an alternating magnetic field is produced by the power transmission side resonance circuit 43, vibration of the alternating magnetic field is transferred to the power reception side resonance circuit 51 which resonates by the same resonance frequency as the power transmission side resonance circuit 43. As a result, an induction current flows in the power reception side resonance circuit 51 due to electromagnetic induction, and an induced electromotive force is generated at the power reception side resonance circuit 51 by the induction current. That is, the power transmission side resonance circuit 43 transmits power to the power reception side resonance circuit 51, and the power reception side resonance circuit 51 receives power from the power transmission side resonance circuit 43.

The power reception side rectification circuit 54 is electrically connected to the power reception side resonance circuit 51 and charging circuit 55. The power reception side rectification circuit 54 rectifies the alternating current power supplied from the power reception side resonance circuit 51 to convert it to direct current power, and supplies the direct current power to the charging circuit 55. The power reception side rectification circuit 54 is, for example, an AC/DC converter.

The charging circuit 55 is electrically connected to the power reception side rectification circuit 54 and the battery 32. In particular, the charging circuit 55 is connected to the battery 32 through a relay 38. The charging circuit 55 converts the direct current power supplied from the power reception side rectification circuit 54 to the voltage level of the battery 32, and supplies it to the battery 32. If the power transmitted from the power transmission apparatus 4 is supplied by the power reception apparatus 5 to the battery 32, the battery 32 is charged. The charging circuit 55 is, for example, a DC/DC converter.

The vehicle side communication device 61 communicates with a wireless base station 16 by wide area wireless communication, and in turn communicates with the server 1 through the communication network 15. Further, the vehicle side communication device 61 is connected to the ECU 70 through the internal vehicle network.

The GNSS receiver 62 detects the current position of the vehicle 3 (for example the latitude and longitude of the vehicle 3), based on the positioning information obtained from a plurality of (for example, three or more) positioning satellites. Specifically, the GNSS receiver 62 captures a plurality of positioning satellites and receives signals emitted from the positioning satellites. Further, the GNSS receiver 62 calculates the distances to the positioning satellites, based on the differences of the times of transmission and times of reception of the signals and detects the current position of the vehicle 3 based on the distances to the positioning satellites and the positions of the positioning satellites (orbital information). The output of the GNSS receiver 62, that is, the current position of the vehicle 3 detected by the GNSS receiver 62, is transmitted to the ECU 70 through the internal vehicle network. As this GNSS receiver 62, for example, a GPS receiver is used.

The storage device 63 stores data. The storage device 63, for example, is provided with a hard disk drive (HDD), solid state drive (SSD), or optical recording medium. In the present embodiment, the storage device 63 stores map information. The map information includes, in addition to information relating to roads, information on installation positions of ground power supply apparatuses 2, position information and power supply capacity information of contact power supply apparatuses such as charging stations. The ECU 70 acquires the map information from the storage device 63. Note that, the storage device 63 need not include map information. In this case, the ECU 70 may acquire map information from outside of the vehicle 3 (for example, the server 1) through the vehicle side communication device 61.

The vehicle side sensors 64 detect the state of the vehicle 3 and the state around the vehicle 3. In the present embodiment, the vehicle side sensors 64 include, as sensors for detecting the state of the vehicle 3, for example, an charge amount sensor for detecting the charge amount of the battery 32, a speed sensor for detecting a speed of the vehicle 3, a current sensor for detecting the value of the charged current and the value of the discharged current of the battery 32, current sensors for detecting the currents of the various equipment of the power reception apparatus 5. Further, if the vehicle 3 is an autonomous driving vehicle, the vehicle side sensors 64 include, as sensors for detecting the state around the vehicle 3, a camera for capturing the surroundings of the vehicle 3 and a distance sensor for detecting the distance to objects in the surroundings of the vehicle 3 (LiDAR, millimeter wave radar, etc.) The outputs of the vehicle side sensors 64 are input to the ECU 70 through the internal vehicle network.

The HMI 65 notifies the driver of the vehicle 3 of notification information received from the ECU 70 through the internal vehicle network. Therefore, the HMI 65 functions as a notification device for notifying information to the driver. Specifically, the HMI 65, for example, has a display device such as a liquid crystal display, speedometer and other meters, warning lights, and a speaker. Further, the HMI 65 receives input from passengers and transmits the received input through the internal vehicle network to the ECU 70. Therefore, the HMI 65 functions as an input device for receiving input from the passengers or driver. Specifically, the HMI 65 has a touch panel, switches, buttons, and a remote controller. The HMI 65, for example, is provided at the instrument panel.

The vehicle actuators 66 are actuators (except PCU 33 and motor 31) used for control of the operation of the vehicle 3. Specifically, the vehicle actuators 66, for example, include a drive actuator for controlling the internal combustion engine and a braking actuator for controlling a brake for braking the vehicle 3. The vehicle actuators 66 may include a steering actuator for controlling steering of the vehicle 3. The vehicle actuators 66 control the acceleration and braking of the vehicle 3 in accordance with control signals transmitted from the ECU 70 through the internal vehicle network and, when including a steering actuator, control the steering of the vehicle 3.

The ECU 70 performs various control operations of the vehicle 3. For example, the ECU 70 is electrically connected to the charging circuit 55 of the power reception apparatus 5, and controls the charging circuit 55 so as to control the charging of the battery 32 by the power transmitted from the power transmission apparatus 4. Further, the ECU 70 is electrically connected to the PCU 33, and controls the PCU 33 so as to control the transfer of power between the battery 32 and the motor 31. Furthermore, the ECU 70 controls equipment connected through the internal vehicle network, for example, the vehicle side communication device 61, storage device 63, HMI 65, and vehicle actuators 66.

The ECU 70 is connected, through an internal vehicle network based on the CAN (Controller Area Network) or other standard, to the PCU 33, charging circuit 55, vehicle side communication device 61, GNSS receiver 62, storage device 63, vehicle side sensors 64, HMI 65, and vehicle actuators 66. The ECU 70 has a communication interface 71, memory 72, and processor 73. The communication interface 71, memory 72, and processor 73 are connected to each other through signal wires.

The communication interface 71 has an interface circuit for connecting the ECU 70 to the internal vehicle network. The ECU 70 communicates with other equipment through the communication interface 71.

The memory 72, for example, has a volatile semiconductor memory (for example, RAM) and nonvolatile semiconductor memory (for example, ROM). The memory 72 stores a computer programs for performing various processing at the processor 73 and various data used when various processing is performed by the processor 73.

The processor 73 has one or more CPUs (central processing units) and their peripheral circuits. The processor 73 may further have a processing circuit such as a logic unit or arithmetic unit. The processor 73 performs various processing based on the computer program stored in the memory 72.

In the present embodiment, the processor 73 functions as a running mode proposal device for proposing a running mode up to a destination of the vehicle 3. In addition, the processor 73 functions as a navigation device for providing a user of the vehicle 3 with road guidance up to the destination.

Proposal of Running Mode

In the meantime, in a navigation device for providing a user of a vehicle 3 with road guidance up to the destination, or in an autonomous driving vehicle in which the vehicle 3 is at least partially operated autonomously, the running mode proposal device proposes a running mode including a target running route of the vehicle 3 or a running speed of the vehicle 3. In the navigation device, the user is provided with road guidance along the target running route proposed in this way. Further, in an autonomous driving vehicle, the vehicle 3 is run along the target running route proposed in this way, or the speed of the vehicle 3 is adjusted based on the proposed target running speed.

In general, such a target running route is set based on a scheduled time at which the vehicle 3 will reach the destination, tolls required for the vehicle 3 to reach the destination, etc. Further, a target running speed is, for example, set to a speed which is the fastest within a range not exceeding a speed limit determined for each road or an upper limit speed determined by the user.

However, in consideration of the supply of power from ground power supply apparatuses 2 to a vehicle 3 while the vehicle 3 is running, the running mode set in the above way will not necessarily always be the most suitable.

Figure 6:
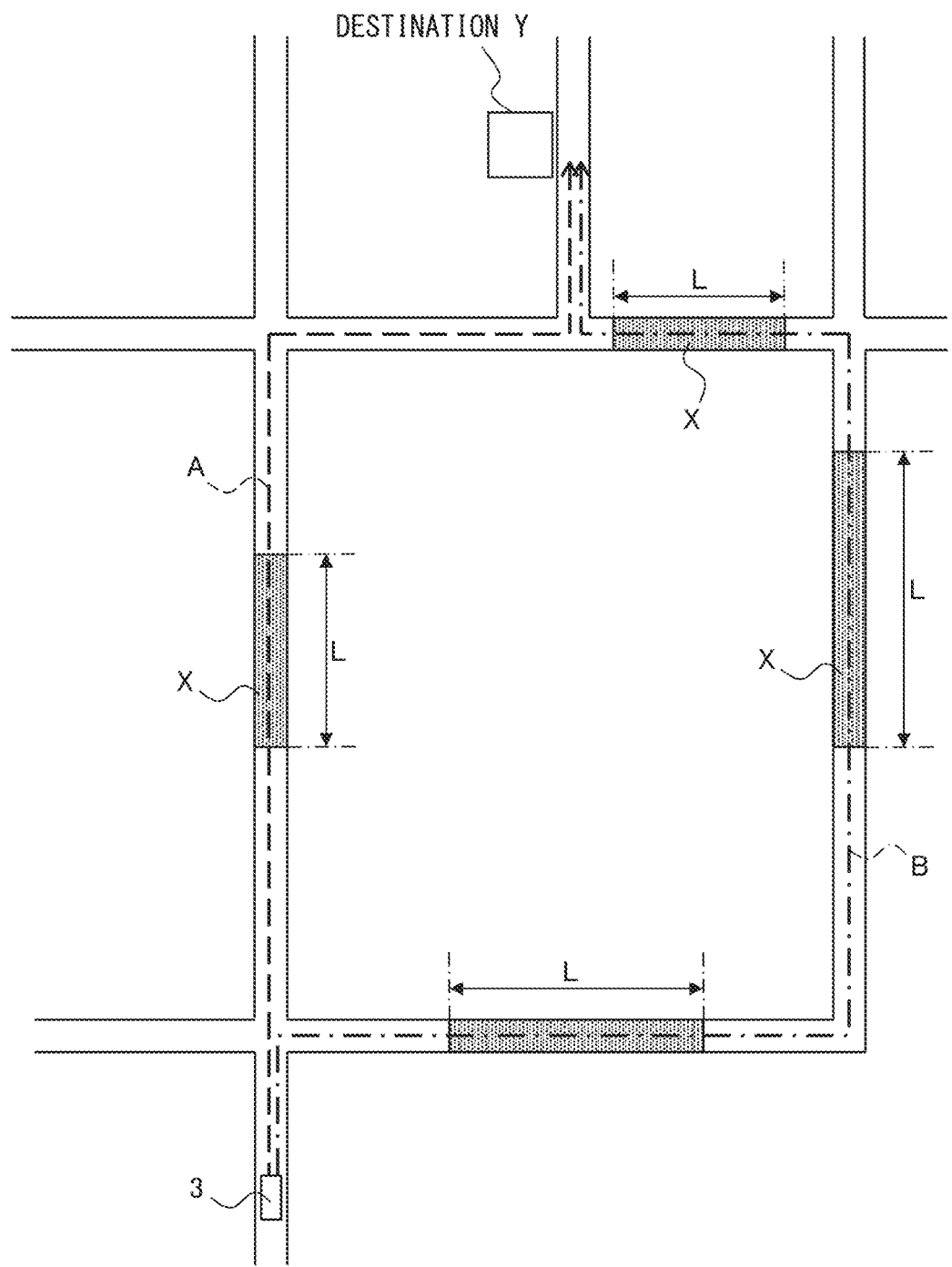
FIG. 6 is a view schematically showing running routes up to a destination.

FIG. 6 is a view schematically showing running routes up to a destination. Sections X in the figure show regions in which ground power supply apparatuses 2 are buried along a lane. Therefore, when a vehicle 3 is running over such a section X, power is supplied from the ground power supply apparatuses 2 to the vehicle 3.

In the example shown in FIG. 6, the case where the vehicle 3 in the figure is heading toward a destination Y is considered. At this time, in the navigation system of the vehicle 3 or in an autonomous driving vehicle, the route selecting part for selecting the running route of the vehicle 3 generally selects the route A in which the running distance to the destination is the shortest. However, the power supply section X on this route A is relatively short. Therefore, if the charge amount of the battery 32 of the vehicle 3 is low, even if power is supplied in the power supply section X on the route A, the battery 32 of the vehicle 3 will not be sufficiently charged and there is the possibility that the charge amount of the battery 32 will become substantially zero before the vehicle 3 reaches the destination Y.

On the other hand, FIG. 6 shows a route B up to the destination separate from the route A. The route B has a running distance longer than the route A, but overall the power supply section X on the route B is relatively long. Therefore, even if the charge amount of the battery 32 of the vehicle 3 is low, due to power being supplied in the power supply section X on the route B, the battery 32 of the vehicle 3 is sufficiently charged and, accordingly, the vehicle 3 can reach the destination Y without the charge amount of the battery 32 becoming substantially zero. Therefore, the running mode proposal device of the present embodiment considers the power supply from the ground power supply apparatuses 2 to propose the running mode of the vehicle 3, in particular, the running route.

Running Mode Proposal Device and Navigation Device

In the present embodiment, the running mode proposal device proposes the running route of a vehicle up to the destination, and the navigation device sets a running route and performs road guidance along the set running route.

Figure 7:
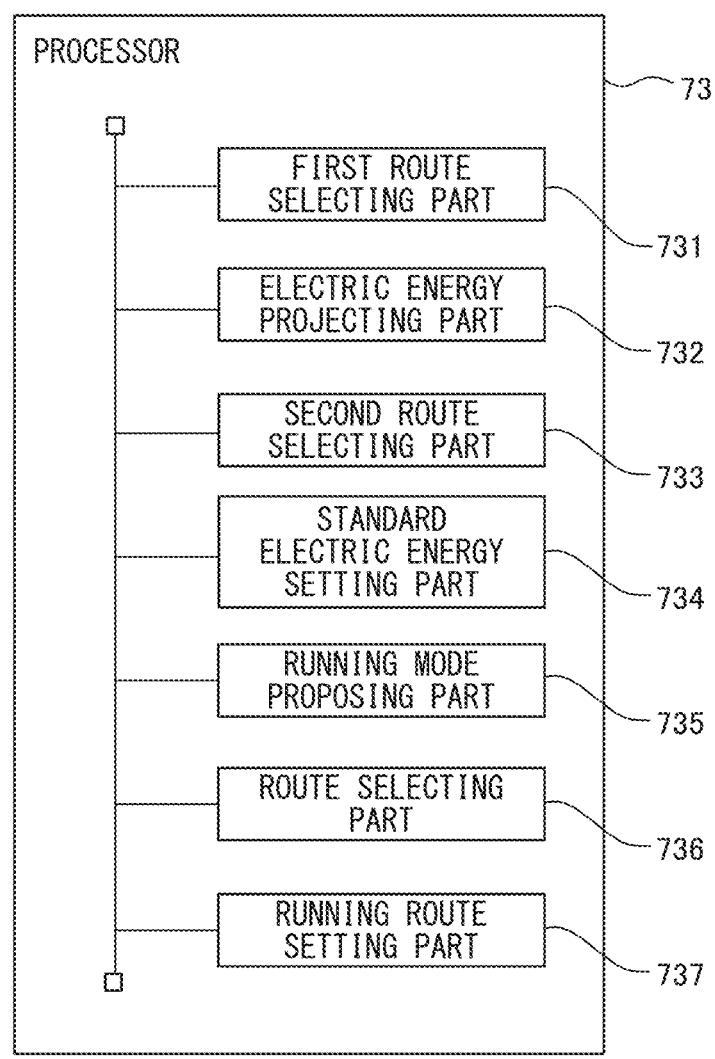
FIG. 7 is a functional block diagram of a processor of a vehicle.

FIG. 7 is a functional block diagram of the processor 73 of the vehicle 3. As shown in FIG. 7, the processor 73 includes a first route selecting part 731, electric energy projecting part 732, second route selecting part 733, standard electric energy setting part 734, running mode proposing part 735, route selecting part 736, and running route setting part 737. The running mode proposal device includes a first route selecting part 731, electric energy projecting part 732, second route selecting part 733, standard electric energy setting part 734, and running mode proposing part 735. Further, a navigation device includes a first route selecting part 731, electric energy projecting part 732, second route selecting part 733, standard electric energy setting part 734, running mode proposing part 735, route selecting part 736, and running route setting part 737.

The first route selecting part 731 selects a first running route up to the destination by a predetermined algorithm unrelated to noncontact power supply from the ground power supply apparatuses 2 to the vehicle 3. A running route selected by the predetermined algorithm is in general a running route similar to the running route selected by the navigation system or the route selecting part of the autonomous driving vehicle. Therefore, the first route selecting part 731, for example, selects, as the first running route, the running route by which the scheduled arrival time at which the vehicle 3 will reach the destination is the earliest.

Alternatively, the first route selecting part 731, for example, selects, as the first running route, the running route by which the scheduled arrival time at which the vehicle 3 reaches the destination is the earliest among the running routes by which the tolls required for reaching the destination are the lowest. The algorithm by which the first route selecting part 731 selects the first running route may be input by the user in advance through the HMI 65.

The electric energy projecting part 732 calculates, assuming the vehicle 3 runs on a predetermined running route up to the destination, the projected supplied electric energy which is projected to be supplied at a power supply section, in which power will be supplied by noncontact from ground power supply apparatuses 2 to the vehicle 3, in the running route.

In the present embodiment, the electric energy projecting part 732, for example, calculates the projected supplied electric energy, based on the average speed in the power supply section of various vehicles 3 running on the power supply section in the past, the length of the power supply section, and the projected supplied power per unit time from the ground power supply apparatuses 2 to the vehicle 3 while the vehicle is running on the power supply section. For example, the electric energy projecting part 732 divides the length of the power supply section by the average speed, and multiplies the value obtained by the division with the projected power supplied per unit time to calculate the projected supplied electric energy. In the example shown in FIG. 6, the supplied electric energy which is projected to be supplied in the power supply section X on the route A is calculated, based on the average speed at this power supply section X, the length L of this power supply section X, and the projected power supplied per unit time while the vehicle running on the power supply section X.

The average speed in a power supply section X is transmitted from the server 1 through the communication network 15. The server 1, for example, receives information on current positions of a large number of vehicles 3 running near ground power supply apparatuses 2 positioned in a range able to communicate with the server 1 by communication with those vehicles 3. Further, the server 1 calculates the average speed of the vehicles 3 running over the ground power supply apparatuses 2, that is, the average speed at the power supply section, based on the changes in the current positions of the vehicles 3. In addition, the server 1 transmits the average speed at the power supply section calculated in this way to the vehicles 3 running in a range able to communicate with the server 1. As a result, the memories 72 of the vehicles 3 store the average speed at the power supply section near the current positions of the vehicles 3. Note that, the server 1 can calculate the average speed at a power supply section by various methods, for example, by calculating the average speed at the power supply section, not based only on information on the current positions of the vehicles 3, but based on the current positions and speeds of the vehicles 3. The length of the power supply section X is stored in the storage devices 63 as map information.

Further, the power supplied per unit time changes mainly according to the types of the power transmission apparatuses 4 of the ground power supply apparatuses 2 and the types of the power reception apparatuses 5 of the vehicles 3. For example, if a power transmission apparatus 4 is configured so that the coil 44 can generate a powerful magnetic field, the power supplied per unit time is larger. Therefore, the projected power Pt supplied per unit time is calculated based on the types of the power transmission apparatuses 4 of the ground power supply apparatuses 2 stored in the storage devices 63 as map information. Note that, the power supplied per unit time may be calculated based on other elements. For example, if due to some sort of circumstance a ground power supply apparatus 2 transmits power in a state where an upper limit on the transmitted power is set, the power supplied per unit time is calculated based on this set value of the upper limit transmitted power. In this case, the server 1 transmits the set upper limit transmitted power to the vehicles 3 through the communication network 15 while the electric energy projecting part 732 of the vehicles 3 calculate the power supplied per unit time based on the sent values of the upper limit transmitted power.

If a projected supplied electric energy calculated by the electric energy projecting part 732 when assuming the vehicle runs on the first running route selected by the first route selecting part 731, is less than a predetermined standard electric energy, the second route selecting part 733 selects a second running route by which the projected supplied electric energy would become greater than or equal to the standard electric energy.

Specifically, for example, when the calculated projected supplied electric energy is less than the standard electric energy, first, the second route selecting part 733 searches for a plurality of running routes up to the destination other than the first running route. Further, the projected supplied electric energies are calculated by the electric energy projecting part 732 for the running routes found. The second route selecting part 733 judges whether the projected supplied electric energy are greater than or equal to the standard amounts of power of the running routes found. Further, the second route selecting part 733 selects, as a second running route, the running route with the earliest scheduled arrival time among the running routes where the projected supplied electric energies are greater than or equal to the standard amounts of power.

The standard electric energy setting part 734 sets the standard electric energy used at the second route selecting part 733. In particular, in the present embodiment, the standard electric energy setting part 734 sets the standard electric energy corresponding to each of the running routes. Specifically, in the present embodiment, the standard electric energy setting part 734 sets, as the standard electric energy, the value obtained by subtracting the current charge amount of the battery 32 of the vehicle 3 from the value obtained by adding a predetermined electric energy required at the time of arrival to the electric energy required by the vehicle 3 to run up to the destination along each running route.

Here, the electric energy required by a vehicle 3 to run up to the destination along a running route is calculated, based on the running distance from the current position of the vehicle 3 up to the destination, and the difference in elevation obtained by subtracting the elevation of the current position from the elevation of the destination, etc. The longer the running distance or the larger the difference in elevation, the greater the required electric energy is calculated as. Further, in addition as well, the electric energy projected as becoming necessary for cooling or heating the vehicle 3, etc., may be added to the required electric energy. Further, the current charge amount of the battery 32 is detected by the vehicle side sensor 64 for detecting the charge amount of the battery 32.

Further, the electric energy required at the time of arrival is the electric energy required to remain in the battery 32 when the vehicle 3 reaches the destination. Therefore, if the vehicle 3 is a BEV and just the vehicle 3 reaching the destination is necessary, the electric energy required at the time of arrival is set to zero. Further, if it is required that the electric energy remain in the battery 32 even after reaching the destination, the electric energy required at the time of arrival is set to any positive value. Further, if the vehicle 3 is an HEV or PHEV and it is possible to generate power by an internal combustion engine until the vehicle 3 reaches the destination, the electric energy required at the time of arrival is set to any negative value.

The running mode proposing part 735 proposes, as the running route up to the destination, the first running route selected by the first route selecting part 731 and, when a second running route is selected by the second route selecting part 733, further proposes the second running route.

The route selecting part 736 makes the user select the running route for road guidance among the running routes proposed by the running mode proposing part 735. That is, the route selecting part 736 makes the user select a running route along which road guidance should be provided, among the first running route and the second running route. Specifically, the route selecting part 736 makes the display device of the HMI 65 display the first running route and the second running route. In addition, the route selecting part 736 makes the display device of the HMI 65 display the scheduled arrival times when the vehicle runs on each of the running routes and the projected charged amounts of the battery 32 at the times of arrival. Further, the route selecting part 736 receives input, from a user, of a running route selected for providing road guidance up to the destination, through the HMI 65 functioning as an input device.

The running route setting part 737 sets the running route selected by the user at the route selecting part 736 as the running route up to the destination. Therefore, if the user selects the second running route at the route selecting part 736, the running route setting part 737 sets the second running route as the running route up to the destination. If the running route up to the destination is set in this way, road guidance to the user is provided along this running route through the display device or speaker of the HMI 65.

Note that, in the present embodiment, the running route setting part 737 sets the running route selected by the user at the route selecting part 736 as the running route up to the destination. However, when a second running route is selected by the second route selecting part 733, the running route setting part 737 may set the second running route as the running route up to the destination without making the user select it, while when a second running route is not selected by the second route selecting part 733, the running route setting part 737 may set the first running route as the running route up to the destination.

Further, in the present embodiment, the electric energy projecting part 732 projects the supplied electric energy projected as being supplied at the power supply sections. However, the electric energy projecting part 732 does not necessarily have to project the supplied electric energy projected as being supplied at the power supply sections, and may project other parameters relating to the projected supplied electric energies. Specifically, for example, instead of the projected supplied electric energies, the projected running times when the vehicle is running on power supply sections (average speeds multiplied with lengths L of power supply sections) may be calculated. In this case, if the projected value of a parameter when assuming running on the first running route is a value indicating that the projected supplied electric energy is less than a predetermined standard electric energy, the second route selecting part 733 selects the second running route so that the projected supplied electric energy becomes greater than or equal to the standard electric energy.

Figure 8:
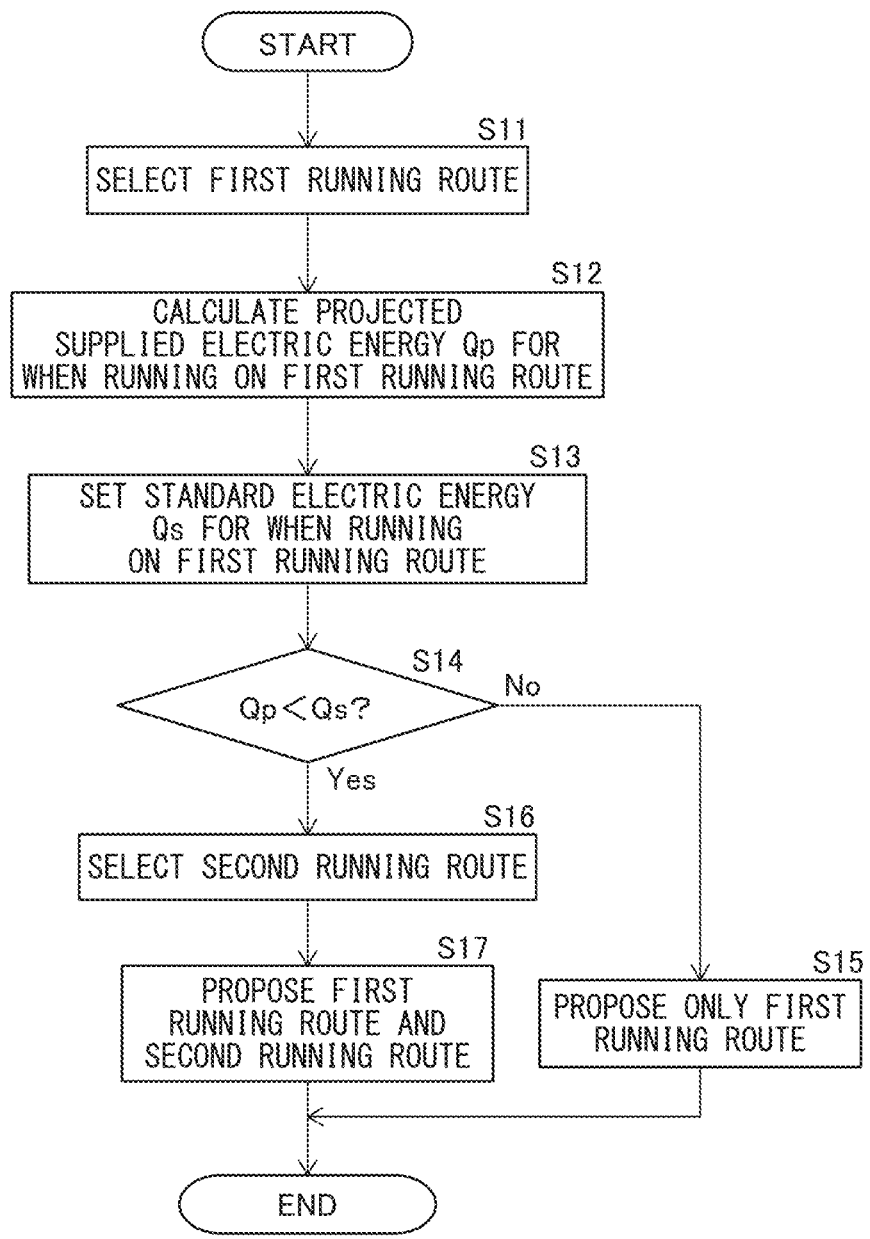
FIG. 8 is a flow chart showing a flow of processing for proposing a running mode performed in a running mode proposal device.

FIG. 8 is a flow chart showing a flow of processing proposing a running mode performed in a running mode proposal device. The processing proposing a running mode shown in FIG. 8 is performed when, for example, a destination is newly input or when the current position of the vehicle 3 is off from running routes set in the past.

As shown in FIG. 8, first, the first route selecting part 731 selects the first running route to the destination by a predetermined algorithm unrelated with noncontact power supply (step S11). In the example shown in FIG. 6, the first route selecting part 731, for example, selects the route A.

Next, the electric energy projecting part 732 calculates the supplied electric energy Qp projected to be supplied by noncontact at the power supply section where power is supplied from ground power supply apparatuses 2 on the first running route to the vehicle 3 when assuming the vehicle 3 runs on the first running route up to the destination (step S12). Therefore, in the example shown in FIG. 6, the electric energy projecting part 732 projects the supplied electric energy projected to be supplied at the power supply section X on the route A.

Next, the standard electric energy setting part 734 sets the standard electric energy Qs corresponding to the second running route (step S13).

Next, the second route selecting part 733 judges if the projected supplied electric energy Qp calculated at step S12 is less than the standard electric energy Qs calculated at step S13 (step S14). If at step S14 it is judged that projected supplied electric energy Qp is greater than or equal to the standard electric energy Qs, the second route selecting part 733 does not select the second running route. Therefore, the running mode proposing part 735 proposes as the running route up to the destination only the first running route selected at step S11 (step S15).

On the other hand, if at step S14 it is judged that projected supplied electric energy Qp is less than the standard electric energy Qs, the second route selecting part 733 selects the second running route (step S16). Next, the running mode proposing part 735 proposes as the running routes up to the destination the first running route selected at step S11 and the second running route selected at step S16 (step S17).

In the present embodiment, when the projected supplied electric energy is less than the standard electric energy, in addition to the first running route, the second running route where the projected supplied electric energy is greater than or equal to the standard electric energy is proposed. Therefore, according to the present embodiment, a running route enabling power to be suitably received from ground power supply apparatuses while the vehicle is running is proposed. Accordingly, it becomes possible for the vehicle 3 to receive the power required for operation from the ground power supply apparatuses 2.

Second Embodiment

Next, referring to FIGS. 9 and 10, a noncontact power supply system according to a second embodiment will be explained. Below, the parts different from the noncontact power supply system according to the first embodiment will be focused on in the explanation. In the present embodiment, the processor 73 of the ECU 70 of the vehicle 3 has an arrival time estimating part 738.

Figure 9:
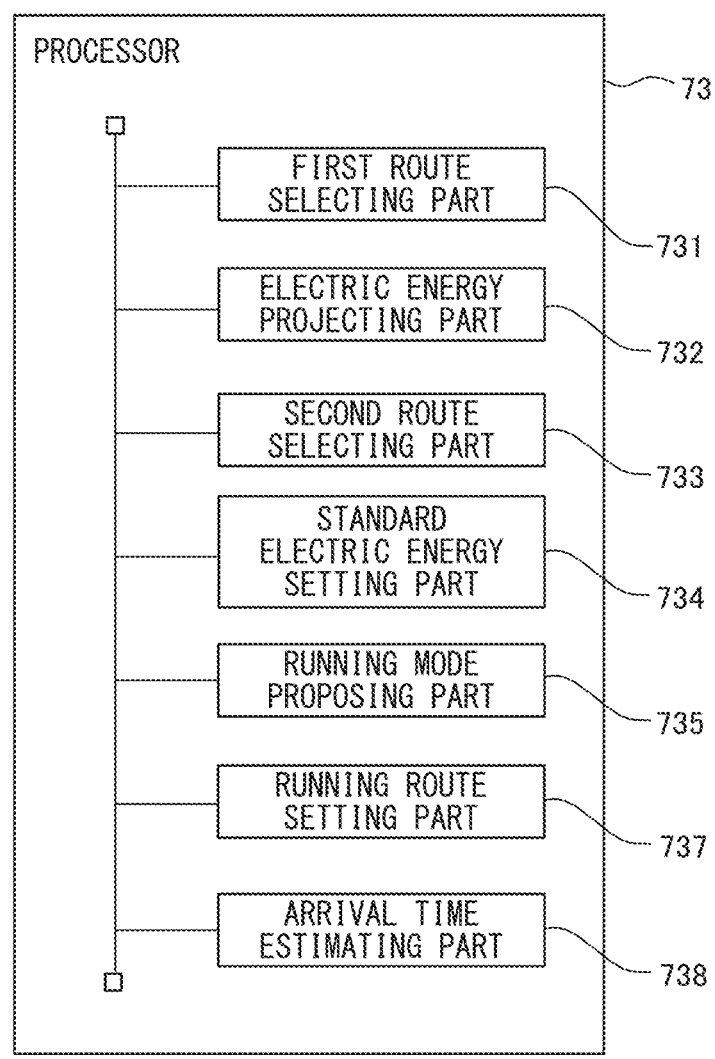
FIG. 9 is a functional block diagram, similar to FIG. 7, of a processor of a vehicle according to a second embodiment.

FIG. 9 is a functional block diagram, similar to FIG. 7, of a processor 73 of a vehicle 3 according to the second embodiment. As shown in FIG. 9, the processor 73 according to the present embodiment has an arrival time estimating part 738, in addition to a first route selecting part 731, electric energy projecting part 732, second route selecting part 733, standard electric energy setting part 734, running mode proposing part 735, and running route setting part 737. The navigation device includes these parts.

When the first running route and the second running route are both selected, the arrival time estimating part 738 estimates the arrival times at the destination when assuming the vehicle runs on the running routes of both the first running route and the second running route. In the present embodiment, when there is a contact power supply facility such as a charging station on the first running route, the arrival time estimating part 738 estimates the time when the vehicle 3 will reach the destination assuming the vehicle 3 is supplied with power at the contact power supply facility. In particular, in the present embodiment, the arrival time estimating part 738 estimates, as the projected arrival time, the time when the vehicle 3 would reach the destination when assuming power is supplied at a contact power supply facility so that the charge amount of the battery 32 of the vehicle 3 upon reaching the destination is greater than or equal to the above-mentioned electric energy required at the time of arrival.

Here, as explained above, the map information stored in the storage device 63 of the vehicle 3 includes position information and power supply capacity information of contact power supply facilities. Therefore, the arrival time estimating part 738 judges if there is a contact power supply facility on the first running route based on the map information stored in the storage device 63. Further, if judging that there is a contact power supply facility on the first running route, the arrival time estimating part 738 calculates the power supply time at the contact power supply facility, based on the power supply capacity information at the contact power supply facility and the electric energy required to be supplied at the contact power supply facility. The arrival time estimating part 738 may calculate the power supply time at the contact supply facility, based on a degree of congestion of the contact power supply facility transmitted from the server 1 or the like. Further, the arrival time estimating part 738 adds the calculated power supply time to the arrival time at the destination assuming the vehicle runs on the first running route without stopping at a contact power supply facility to thereby estimate the projected arrival time at the destination when assuming the vehicle is supplied with power at the contact power supply facility.

In the present embodiment, when the second running route is selected by the second route selecting part 733, the running route setting part 737 sets, as the running route up to the destination, the running route with the earlier arrival time estimated by the arrival time estimating part 738 among the first running route and the second running route. If the running route up to the destination is set in this way, road guidance to the user along this running route is provided through the display device or speaker of the HMI 65.

In the present embodiment, the projected arrival times when the vehicle runs on the different running routes are estimated, considering the case where power is supplied at a contact power supply facility on the first running route. Therefore, it is possible to reach the destination by the running route with the earlier projected arrival time, while the charge amount of the battery 32 is maintained.

Figure 10:
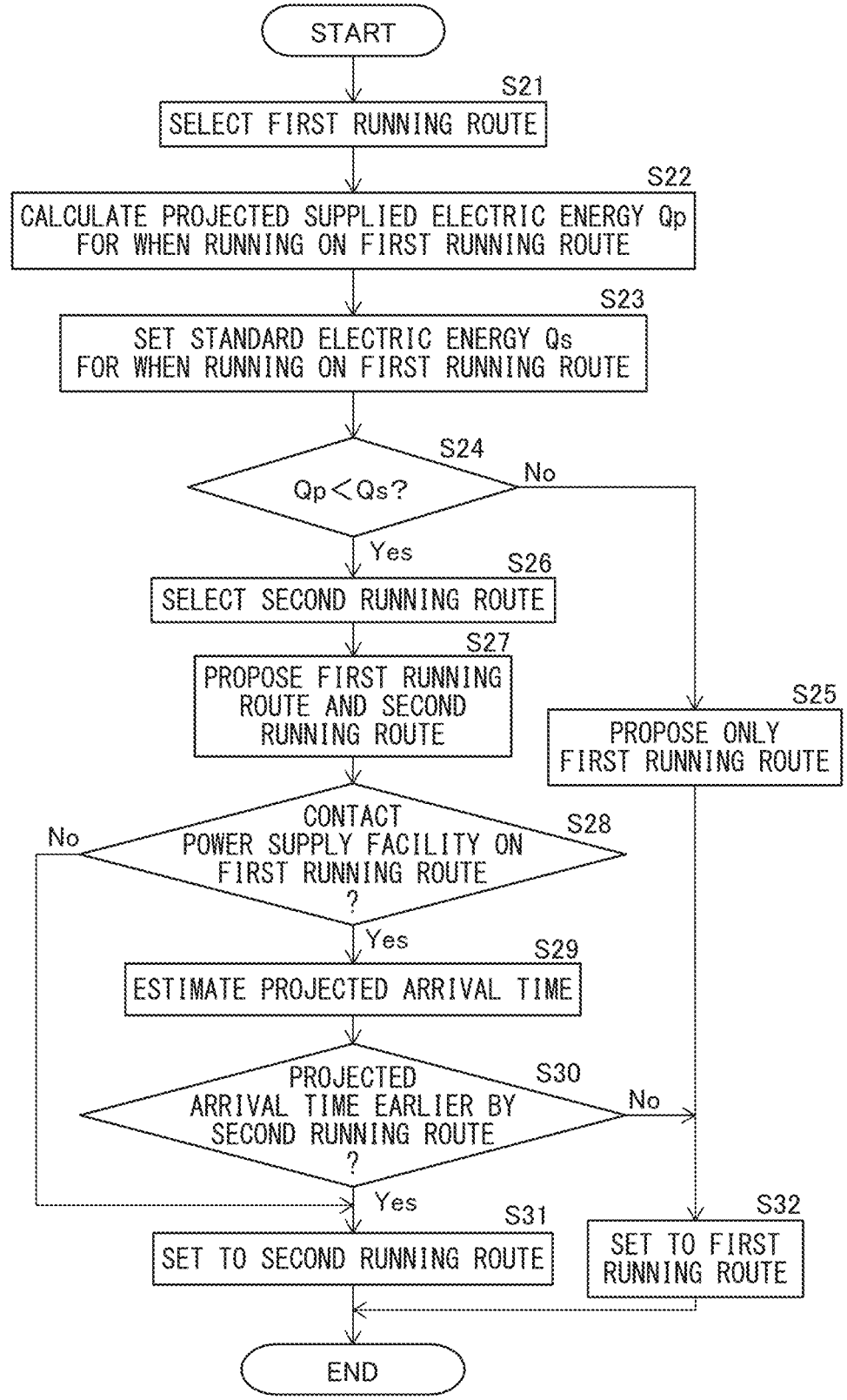
FIG. 10 is a flow chart showing a flow of processing for setting a running mode performed in a navigation device including a running mode proposal device.

FIG. 10 is a flow chart showing a flow of processing for setting a running mode performed in a navigation device including a running mode proposal device. Similarly to the processing for proposing a running mode, the processing for setting shown in FIG. 10 is performed when, for example, a destination is newly input or when the current position of the vehicle 3 is off from running routes set in the past. Note that, steps S21 to S27 of FIG. 10 are similar to steps S11 to S17 of FIG. 8, therefore explanations will be omitted.

If at step S27 the running mode proposing part 735 proposes two running routes, the arrival time estimating part 738 judges if there is a contact power supply facility in the first running route (step S28). The arrival time estimating part 738 acquires the installation position of a contact power supply facility from map information stored in the storage device 63, and judges if the obtained installation position is located on the first running route. If at step S28 it is judged that there is a contact power supply facility on the first running route, the arrival time estimating part 738 estimates the projected arrival times at the destination for the different running routes (step S29). In particular, the arrival time estimating part 738 estimates the projected arrival time at the destination when assuming the vehicle is supplied with power at the contact power supply facility on the first running route.

Next, the running route setting part 737 judges if the projected arrival time when the vehicle runs on the second running route is earlier than the projected arrival time when the vehicle runs on the first running route (step S30). If at step S30 it is judged that the projected arrival time when the vehicle runs on the second running route is earlier than the projected arrival time when the vehicle runs on the first running route, the running route setting part 737 sets the running route to the destination to the second running route (step S31). On the other hand, if at step S30 it is judged that the projected arrival time when the vehicle runs on the second running route is later than the projected arrival time when the vehicle runs on the first running route, the running route setting part 737 sets the running route to the destination to the first running route (step S32). Further, if at step S28 it is judged that the first running route does not have any contact power supply facility, the running route setting part 737 sets the running route to the destination to the second running route (step S31).

Third Embodiment

Next, referring to FIG. 11, a power supply system according to a third embodiment will be explained. Below, the parts different from the noncontact power supply systems according to the first embodiment and second embodiment will be focused on in the explanation. In the above embodiment, the processor 73 of the ECU 70 of the vehicle 3 functioned as a navigation device, while in the present embodiment, the processor 73 functions as a running control device making the vehicle 3 autonomously run.

Figure 11:
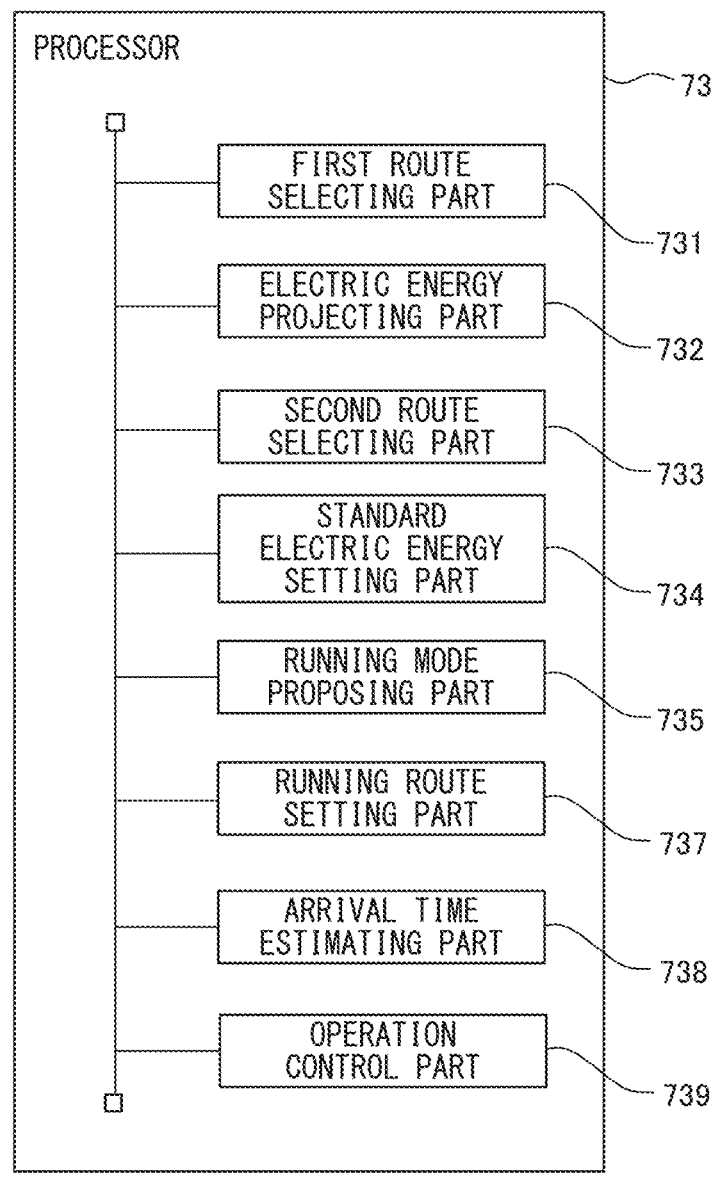
FIG. 11 is a functional block diagram, similar to FIG. 7, of a processor of a vehicle according to a third embodiment.

FIG. 11 is a functional block diagram, similar to FIG. 7, of a processor 73 of a vehicle 3 according to the third embodiment. As shown in FIG. 11, the processor 73 according to the present embodiment includes an arrival time estimating part 738 and operation control part 739, in addition to the first route selecting part 731, electric energy projecting part 732, second route selecting part 733, standard electric energy setting part 734, running mode proposing part 735, and running route setting part 737. The running control device includes these parts.

In the present embodiment, the running route setting part 737 sets the running route up to the destination, similarly to the running route setting part 737 of the vehicle 3 according to the second embodiment.

The operation control part 739 controls the vehicle 3 so that the vehicle autonomously runs along the running route set by the running route setting part 737. Specifically, the operation control part 739 detects objects at the surroundings of the vehicle 3 based on the outputs of the camera, LiDAR, milliwave radar, etc., of the vehicle side sensors 64. In addition, the operation control part 739 acquires current position information of the vehicle 3 detected by the GNSS receiver 62. Further, the operation control part 739 sets the target running path from the current position of the vehicle 3 to several hundred meters in front (including target speeds at different points). In addition, the operation control part 739 drives the motor 31 and the vehicle actuators 66 so as to make the vehicle 3 run along the target running path set in this way. As a result, the vehicle 3 autonomously runs along the running route set by the running route setting part 737.

Note that, the running route setting part 737 may be configured to set the second running route as the running route up to the destination when a second running route is proposed by the second route selecting part 733. Due to this, the vehicle 3 can autonomously reach the destination without the user obtaining the supply of power by a contact power supply facility and without the charge amount of the battery 32 becoming substantially zero in the midst of way to the destination.

Fourth Embodiment

Next, referring to FIG. 12. a noncontact power supply system according to a fourth embodiment will be explained. Below, the parts different from the noncontact power supply systems according to the first embodiment to the third embodiment will be focused on in the explanation.

In the above-mentioned first embodiment to third embodiment, if the projected supplied electric energy when assuming vehicle runs on the first running route is less than the standard electric energy, a second running route is proposed. On the other hand, in the present embodiment, in such case, making the running speed when the vehicle is running on a power supply section on the first running route decrease to lengthen the power supply time is proposed.

Figure 12:
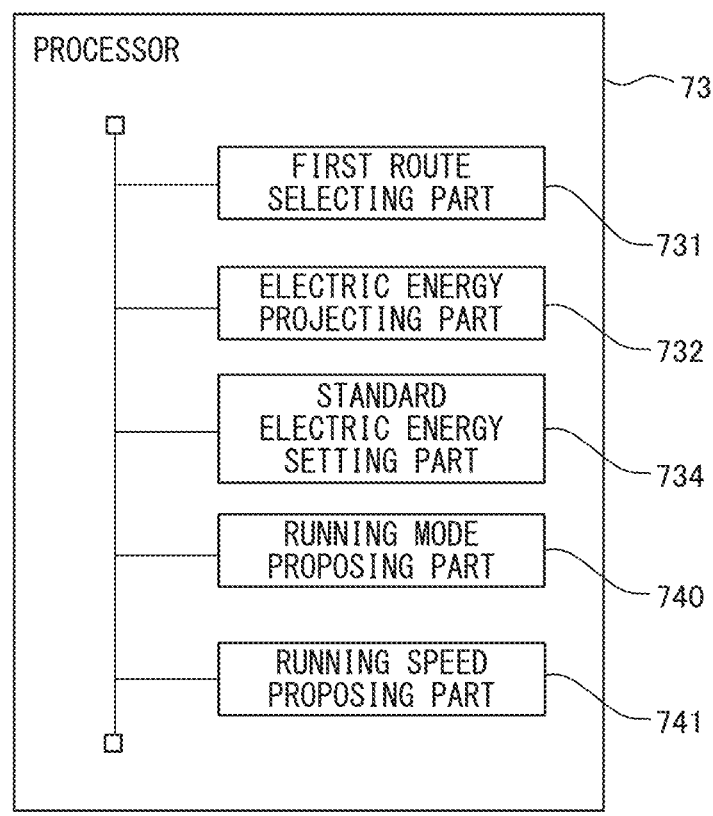
FIG. 12 is a functional block diagram, similar to FIG. 7, of a processor of a vehicle according to a fourth embodiment.

FIG. 12 is a functional block diagram, similar to FIG. 7, of a processor 73 of a vehicle 3 according to the fourth embodiment. As shown in FIG. 12, the processor 73 according to the present embodiment has a first route selecting part 731, electric energy projecting part 732, standard electric energy setting part 734, running mode proposing part 740, and running speed proposing part 741. The first route selecting part 731, electric energy projecting part 732, and standard electric energy setting part 734 are similar to those in the above-mentioned embodiments, therefore explanations will be omitted.

The running mode proposing part 740 in the present embodiment proposes, as the running route up to the destination, the first running route selected by the first route selecting part 731. In addition, if the projected supplied electric energy calculated by the electric energy projecting part 732 when assuming the vehicle runs on the first running route selected by the first route selecting part 731 is less than a predetermined standard electric energy, the running mode proposing part 740 proposes to run on a power supply section on the first running route by a target running speed slower than the average speed.

Further, the target running speed is any speed by which the projected supplied electric energy will be greater than or equal to the standard electric energy if the vehicle 3 runs on a power supply section on the first running route by the target running speed. However, if the projected supplied electric energy is large, the target running speed would be slower and surrounding vehicles would be obstructed while the vehicle 3 is running on the power supply section, therefore the target running speed is preferably a speed by which the projected supplied electric energy would become the standard electric energy.

The running speed proposing part 741 sets, as the running route up to the destination, the first running route proposed by the running mode proposing part 740. Therefore, road guidance to the user along the first running route is performed through the display device or speaker of the HMI 65. In addition, the running speed proposing part 741 proposes to the user a target running speed of the vehicle 3 in a power supply section on the first running route. Specifically, the running speed proposing part 741 displays on the display device the position of a power supply section on the first running route and the target running speed in that power supply section, and provides voice guidance to the user from the speaker so that the vehicle 3 runs at the target running speed, right before or while the vehicle runs on that power supply section.

According to the present embodiment, it is proposed to make the running speed decrease in a power supply section on the first running route. By making the running speed when the vehicle runs on a power supply section decrease in this way, it is possible to increase the electric energy supplied in the power supply section and, accordingly, is possible to receive from the ground power supply apparatuses 2 power sufficient for reaching the destination.

Note that, in the present embodiment, similarly to the first embodiment, the electric energy projecting part 732 calculates the projected supplied electric energy, based on the average speed in a power supply section of various vehicles 3 running on the power supply section in the past. However, the electric energy projecting part 732 may calculate projected supplied electric energy, based on any standard speed different from the average speed (for example, the speed limit) etc. In this case, the running mode proposing part 740 proposes to run on a power supply section on the first running route by a target running speed slower than this standard speed.

Figure 13:
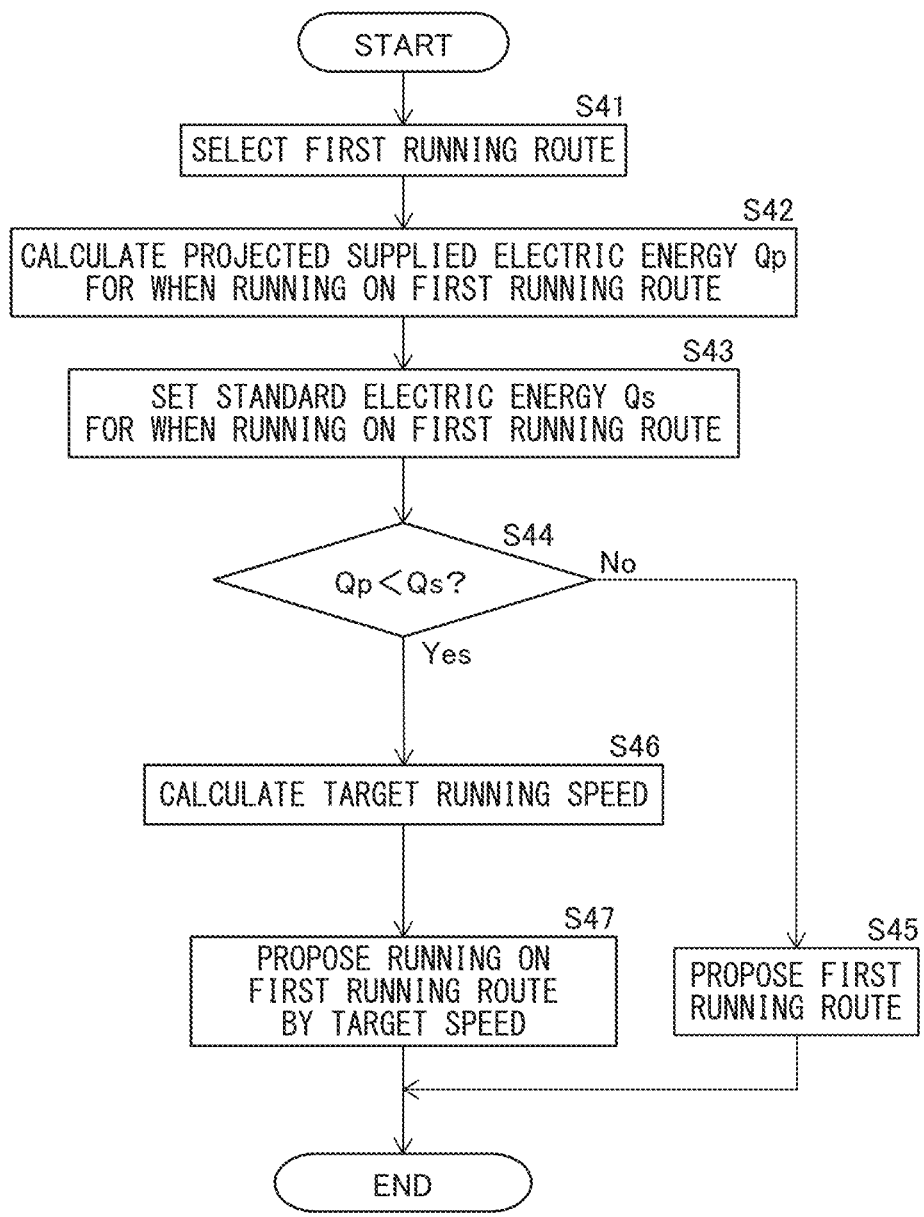
FIG. 13 is a flow chart showing a flow of processing for proposing a running mode performed in a running mode proposal device according to a fourth embodiment.

FIG. 13 is a flow chart showing a flow of processing for proposing a running mode performed in a running mode proposal device according to the fourth embodiment. The processing for proposing a running mode shown in FIG. 13 is performed when, for example, a destination is newly input or when the current position of the vehicle 3 is off from running routes set in the past. Note that, steps S41 to S45 of FIG. 13 are similar to steps S11 to S15 of FIG. 8, therefore explanations will be omitted.

If at step S44 it is judged that a projected supplied electric energy Qp is less than the standard electric energy Qs, the running mode proposing part 740 calculates the target running speed when the vehicle runs on a power supply section on the first running route (step S46). Next, the running mode proposing part 740 proposes, as the running route up to the destination, the first running route selected at step S41, and proposes running at the target running speed calculated at step S46 when the vehicle runs on the power supply section on the first running route (step S47).

Fifth Embodiment

Next, referring to FIGS. 14 and 15, a noncontact power supply system according to a fifth embodiment will be explained. Below, the parts different from the noncontact power supply systems according to the first embodiment to fourth embodiment will be focused on in the explanation.

In the present embodiment, if the projected supplied electric energy when assuming the vehicle runs on the first running route is less than the standard electric energy, both making the running speed when the vehicle runs on a power supply section in the first running route decrease and running on the second running route such as explained above are proposed.

Figure 14:
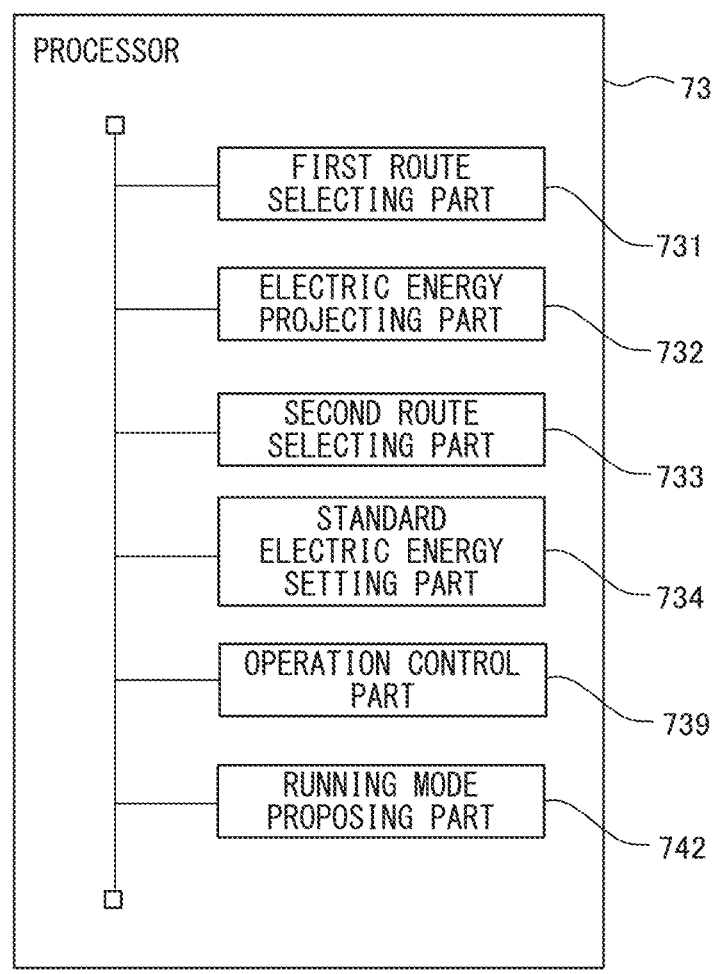
FIG. 14 is a functional block diagram, similar to FIG. 7, of a processor of a vehicle according to a fifth embodiment.

FIG. 14 is a functional block diagram, similar to FIG. 7, of the processor 73 of the vehicle 3 according to the fifth embodiment. As shown in FIG. 14, the processor 73 according to the present embodiment has a first route selecting part 731, electric energy projecting part 732, second route selecting part 733, standard electric energy setting part 734, operation control part 739, and running mode proposing part 742. The first route selecting part 731, electric energy projecting part 732, second route selecting part 733, and standard electric energy setting part 734 are similar to those in the above-mentioned embodiments, therefore explanations will be omitted.

The running mode proposing part 742 proposes, as a running route up to the destination, a first running route selected by the first route selecting part 731, as the first running mode. In addition, if a projected supplied electric energy calculated by the electric energy projecting part 732 when assuming the vehicle runs over the first running route selected by the first route selecting part 731 is less than a predetermined standard electric energy, the running mode proposing part 740 proposes, as a second running mode, to set the first running route as the running route up to the destination and to run over a power supply section on the first running route by a target running speed slower than an average speed.

In addition, if a second running route is selected by the second route selecting part 733, that is, if the projected supplied electric energy is less than the predetermined standard electric energy, the running mode proposing part 742 proposes, as a third running mode, to set the second running route as the running route up to the destination.

If a projected supplied electric energy calculated by the electric energy projecting part 732 when assuming the vehicle runs on the first running route selected by the first route selecting part 731 is greater than or equal to a predetermined standard electric energy, the operation control part 739 sets the first running route as the running route up to the destination.

On the other hand, when the projected supplied electric energy is less than the standard electric energy and the target running speed is greater than or equal to the lower limit speed, the operation control part 739 sets the first running route, as the running route up to the destination. In addition, at this time, the operation control part 739 sets the running speed in a power supply section on the first running route to the target running speed proposed by the running mode proposing part 742. Further, when the projected supplied electric energy is less than the standard electric energy and the target running speed is less than the lower limit speed, the operation control part 739 sets the second running route to the running route up to the destination. Note that, the lower limit speed is a speed by which it is projected that surrounding vehicles would be obstructed if the speed of the vehicle 3 running over the power supply section were to fall any further and, for example, is set in advance for each speed limit or each power supply section.

According to the present embodiment, if the running speed in a power supply section is expected to be extremely slow, the running route up to the destination is set to the second running route. On the other hand, if the running speed in a power supply section will not be that slow, the running route up to the destination is set to the shortest first running route. Therefore, sufficient power for reaching the destination can be received from the ground power supply apparatuses 2, while the arrival time at the destination is made as earlier as possible.

Figure 15:
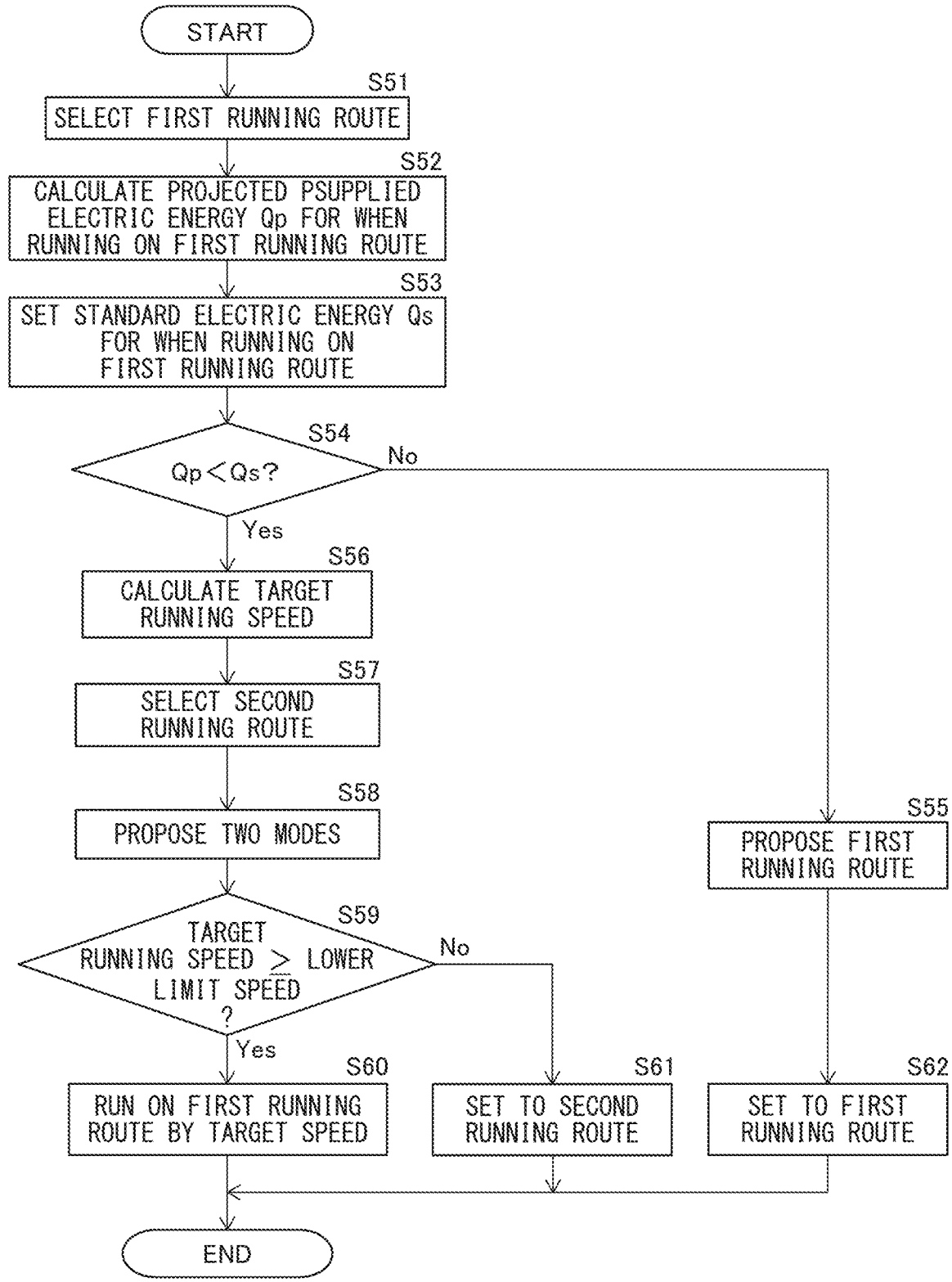
FIG. 15 is a flow chart showing a flow of processing for controlling operation performed in a running control device including a running mode proposal device.

FIG. 15 is a flow chart showing a flow of processing for control of operation performed in a running control device including a running mode proposal device. Similarly to the processing for proposing a running mode, the processing for controlling operation shown in FIG. 15 is performed when, for example, a destination is newly input or when the current position of the vehicle 3 is off from running routes set in the past. Note that, steps S51 to S56 of FIG. 15 are similar to steps S41 to S46 of FIG. 13, therefore explanations will be omitted.

If at step S56 the target running speed when the vehicle runs on a power supply section on the first running route is calculated, the second route selecting part 733 selects the second running route (step S57). Next, the running mode proposing part 742 proposes, as running modes to the destination, the two running modes of a mode of running on the first running route selected at step S51 and running on a power supply section by the target running speed calculated at step S56 and a mode of running on the second running route selected at step S16 (step S58).

Next, the operation control part 739 judges if the target running speed calculated at step S56 is greater than or equal to a lower limit speed (step S59). The lower limit speed is, for example, calculated based on the lower limit speed information for each power supply section stored in the storage device 63 as map information and the current position detected by the GNSS receiver 62.

If at step S59 it is judged that target running speed is greater than or equal to the lower limit speed, the operation control part 739 sets the first running route, as the running route up to the destination, and makes the vehicle 3 run by the target running speed in a power supply section on the first running route (step S60). On the other hand, if at step S59 it is judged that target running speed is less than the lower limit speed, the operation control part 739 sets the second running route, as the running route up to the destination (step S61).

On the other hand, if at step S55 only the first running route is proposed by the running mode proposing part 742 as the running route up to the destination, the operation control part 739 sets the first running route, as the running route up to the destination (step S62). At this time, the operation control part 739 does not allow the vehicle 3 to run at the target running speed calculated at step S56, in the power supply section of the first running route.

Above, preferred embodiments according to the present invention were explained, but the present invention is not limited to these embodiments and can be corrected and changed within the language of the claims.

The invention claimed is:

1. A navigation device, comprising:
a processor configured to:
select a first running route up to a destination of a vehicle by a predetermined algorithm unrelated to noncontact power supply;
calculate, assuming that the vehicle runs on the first running route, a value of a parameter relating to a projected supplied electric energy supplied at a power supply section where power is supplied by noncontact from a ground power supply apparatus on the first running route to the vehicle, wherein the value of the parameter relating to the projected supplied electric energy is calculated based on an average speed of vehicles running over the power supply section in the past, a length of the power supply section, and the supplied power per unit time from the ground power supply apparatus to the vehicle when the vehicle runs over that power supply section; and in response to the calculated value of the parameter being less than a predetermined standard electric energy, select a second running route by which the projected supplied electric energy will be greater than or equal to the predetermined standard electric energy;

propose, as a running route up to the destination, the first running route and the second running route;

make a user select a running route for road guidance among the first running route and the second running route; and set the running route selected by the user as the running route up to the destination.

2. The navigation device according to claim 1, wherein the processor is configured to set, as the predetermined standard electric energy, a value obtained by subtracting a current charged amount of a battery of the vehicle from a value obtained by adding a predetermined electric energy required at a time of arrival to the electric energy required for the vehicle to run to the destination along the first running route.

3. The navigation device according to claim 2, wherein the electric energy required at the time of arrival is zero.

4. The navigation device according to claim 1, wherein the processor is configured to estimate an arrival time at the destination when the vehicle runs on each of the first running route and the second running route, and the processor is configured to, when there is a contact power supply facility on the first running route, estimate, as a projected arrival time at the destination assuming that the vehicle runs on the first running route, a time when the vehicle will reach the destination when assuming supply of power at the contact power supply facility is performed so that a charged amount of a battery of the vehicle when the vehicle reaches the destination is greater than or equal to a predetermined electric energy required at the arrival time.

5. The navigation device according to claim 4, wherein the processor is configured to set, as the running route up to the destination, the running route with an earlier arrival time among the first running route and the second running route.

6. A running control device of a vehicle, comprising:
a processor configured to:
select a first running route up to a destination of a vehicle by a predetermined algorithm unrelated to noncontact power supply;
calculate, assuming that the vehicle runs on the first running route, a value of a parameter relating to a projected supplied electric energy supplied at a power supply section where power is supplied by noncontact from a ground power supply apparatus on the first running route to the vehicle, wherein
the value of the parameter relating to the projected supplied electric energy is calculated based on an average speed of vehicles running over the power supply section in the past, a length of the power supply section, and the supplied power per unit time from the ground power supply apparatus to the vehicle when the vehicle runs over that power supply section; and in response to the calculated value of the parameter being less than a predetermined standard electric energy, select a second running route by which the projected supplied electric energy will be greater than or equal to the predetermined standard electric energy;

propose, as a running route up to the destination, the first running route and the second running route;

set, as the running route up to the destination, the second running route; and control the vehicle so that the vehicle autonomously runs along the set running route.

7. A running control device of a vehicle, comprising:
a processor configured to:
select a first running route up to a destination of a vehicle by a predetermined algorithm unrelated to noncontact power supply;
calculate, assuming that the vehicle runs on the first running route, a value of a parameter relating to a projected supplied electric energy supplied at a power supply section where power is supplied by noncontact from a ground power supply apparatus on the first running route to the vehicle, wherein
the value of the parameter relating to the projected supplied electric energy is calculated based on an average speed of vehicles running over the power supply section in the past, a length of the power supply section, and the supplied power per unit time from the ground power supply apparatus to the vehicle when the vehicle runs over that power supply section;

in response to the calculated value of the parameter being less than a predetermined standard electric energy, select a second running route by which the projected supplied electric energy will be greater than or equal to the predetermined standard electric energy;

propose, as a running route up to the destination, the first running route, and the second running route in response to the second running route being selected;

estimate an arrival time at the destination when the vehicle runs on each of the first running route and the second running route;

when there is a contact power supply facility on the first running route, estimate, as a projected arrival time at the destination assuming that the vehicle runs on the first running route, the time when the vehicle will reach the destination when assuming supply of power at the contact power supply facility is performed so that a charged amount of a battery of the vehicle when the vehicle reaches the destination is greater than or equal to a predetermined electric energy required at a time of arrival;

set, as the running route up to the destination, the running route with an earlier arrival time among the first running route and the second running route; and control the vehicle so that the vehicle autonomously runs along the set running route.

8. The navigation device according to claim 1, wherein
the processor is configured to, in response to the calculated value of the parameter being greater than the predetermined standard electric energy,
propose the first running route, and
set, as the running route up to the destination, the first running route.

9. The running control device according to claim 6, wherein
the processor is configured to, in response to the calculated value of the parameter being greater than the predetermined standard electric energy,
propose the first running route, and
set, as the running route up to the destination, the first running route.

10. The running control device according to claim 7, wherein
the processor is configured to, in response to the calculated value of the parameter being greater than the predetermined standard electric energy,
propose the first running route, and
set, as the running route up to the destination, the first running route.

* * * * *